US011523122B2

(12) United States Patent
Lim et al.

(10) Patent No.: US 11,523,122 B2
(45) Date of Patent: *Dec. 6, 2022

(54) METHOD OF ENCODING AN IMAGE INTO A CODED IMAGE, METHOD OF DECODING A CODED IMAGE, AND APPARATUSES THEREOF

(71) Applicant: Sun Patent Trust, New York, NY (US)

(72) Inventors: Chong Soon Lim, Singapore (SG); Viktor Wahadaniah, Singapore (SG); Sue Mon Thet Naing, San Jose, CA (US); Hisao Sasai, Osaka (JP); Takahiro Nishi, Nara (JP); Youji Shibahara, Osaka (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,237

(22) Filed: Mar. 10, 2021

(65) Prior Publication Data

US 2021/0195209 A1     Jun. 24, 2021

Related U.S. Application Data

(63) Continuation of application No. 16/852,671, filed on Apr. 20, 2020, now Pat. No. 10,979,720, which is a
(Continued)

(51) Int. Cl.
*H04N 19/46* (2014.01)
*H04N 19/50* (2014.01)
(Continued)

(52) U.S. Cl.
CPC ......... *H04N 19/159* (2014.11); *H04N 19/126* (2014.11); *H04N 19/157* (2014.11);
(Continued)

(58) Field of Classification Search
None
See application file for complete search history.

(56) References Cited

U.S. PATENT DOCUMENTS

| 5,870,094 A | 2/1999 | Deering |
| 6,400,768 B1 | 6/2002 | Nagumo |

(Continued)

FOREIGN PATENT DOCUMENTS

| WO | 2011/064926 | 6/2011 |
| WO | 2011/152518 | 12/2011 |

OTHER PUBLICATIONS

International Search Report dated Apr. 17, 2012 in International (PCT) Application No. PCT/JP2012/001474.
(Continued)

*Primary Examiner* — Mohammad J Rahman
(74) *Attorney, Agent, or Firm* — Wenderoth, Lind & Ponack, L.L.P.

(57) ABSTRACT

A method of encoding an image into a coded image, the method comprising: writing a quantization offset parameter into the coded image, determining a prediction mode type for coding a block of image samples of the image into a coding unit of the coded image, determining a quantization parameter for the block of image samples, and determining if the prediction mode type is of a predetermined type, wherein if the prediction mode type is of the predetermined type, the method further comprises: modifying the determined quantization parameter using the quantization offset parameter, and performing a quantization process for the block of image samples using the modified quantization parameter, and wherein if the prediction mode type is not of the predetermined type, the method further comprises: performing a quantization process for the block of image samples using the determined quantization parameter.

4 Claims, 30 Drawing Sheets

Related U.S. Application Data continuation of application No. 16/056,939, filed on Aug. 7, 2018, now Pat. No. 10,666,951, which is a continuation of application No. 15/695,270, filed on Sep. 5, 2017, now Pat. No. 10,070,138, which is a continuation of application No. 15/210,136, filed on Jul. 14, 2016, now Pat. No. 9,787,993, which is a continuation of application No. 13/810,540, filed as application No. PCT/JP2012/001474 on Mar. 2, 2012, now Pat. No. 9,438,906.

(60) Provisional application No. 61/448,853, filed on Mar. 3, 2011.

(51) Int. Cl.
| | | |
|---|---|---|
| H04N 19/61 | (2014.01) | |
| H04N 19/126 | (2014.01) | |
| H04N 19/157 | (2014.01) | |
| H04N 19/172 | (2014.01) | |
| H04N 19/196 | (2014.01) | |
| H04N 19/159 | (2014.01) | |
| H04N 19/176 | (2014.01) | |

(52) U.S. Cl.
CPC ......... *H04N 19/172* (2014.11); *H04N 19/176* (2014.11); *H04N 19/196* (2014.11); *H04N 19/46* (2014.11); *H04N 19/50* (2014.11); *H04N 19/61* (2014.11)

(56) References Cited

U.S. PATENT DOCUMENTS

| | | |
|---|---|---|
| 8,254,450 B2 | 8/2012 | Ugur |
| 8,326,068 B1 | 12/2012 | Zhang |
| 8,831,089 B1 | 9/2014 | Zhang |
| 9,369,718 B2 | 6/2016 | Lim |
| 2003/0223498 A1 | 12/2003 | Park |
| 2005/0117646 A1 | 6/2005 | Joch |
| 2006/0104349 A1 | 5/2006 | Joch |
| 2006/0120450 A1 | 6/2006 | Han et al. |
| 2006/0209962 A1 | 9/2006 | Park |
| 2006/0239349 A1 | 10/2006 | Shibayama |
| 2007/0058714 A1 | 3/2007 | Noda |
| 2007/0160129 A1 | 7/2007 | Fujisawa |
| 2008/0063051 A1 | 3/2008 | Kwon et al. |
| 2008/0219354 A1 | 9/2008 | Segall |
| 2008/0232465 A1 | 9/2008 | Zhang |
| 2009/0052535 A1 | 2/2009 | Ugur |
| 2009/0086814 A1 | 4/2009 | Leontaris |
| 2009/0086816 A1 | 4/2009 | Leontaris |
| 2009/0175349 A1* | 7/2009 | Ye ............ H04N 19/70 375/240.23 |
| 2009/0207911 A1 | 8/2009 | Minamoto |
| 2010/0098173 A1 | 4/2010 | Horiuchi |
| 2010/0135386 A1 | 6/2010 | Shibata |
| 2010/0150241 A1 | 6/2010 | Nilsson |
| 2010/0202513 A1 | 8/2010 | Arakawa |
| 2010/0254458 A1* | 10/2010 | Amon ............ H04N 19/70 375/E7.243 |
| 2010/0266042 A1 | 10/2010 | Koo |
| 2010/0266047 A1 | 10/2010 | Takahashi |
| 2010/0278236 A1 | 11/2010 | Yang |
| 2011/0026611 A1 | 2/2011 | Kenji |
| 2011/0090960 A1 | 4/2011 | Leontaris |
| 2011/0096826 A1 | 4/2011 | Han et al. |
| 2011/0096829 A1 | 4/2011 | Han et al. |
| 2011/0170012 A1 | 7/2011 | Cheon et al. |
| 2011/0194613 A1 | 8/2011 | Chen et al. |
| 2012/0114043 A1 | 5/2012 | Lee et al. |
| 2012/0177109 A1 | 7/2012 | Ye et al. |
| 2012/0189049 A1 | 7/2012 | Coban et al. |
| 2012/0189052 A1 | 7/2012 | Karczewicz et al. |
| 2012/0201297 A1 | 8/2012 | Lim et al. |
| 2013/0028316 A1 | 1/2013 | Leontaris |
| 2013/0058417 A1 | 3/2013 | Ikai |
| 2013/0070850 A1 | 3/2013 | Jeon et al. |
| 2013/0114694 A1 | 5/2013 | Chen |
| 2013/0156103 A1 | 6/2013 | Wang |
| 2013/0156335 A1 | 6/2013 | Lim et al. |
| 2014/0112392 A1 | 4/2014 | Lim |
| 2014/0241420 A1 | 8/2014 | Orton-Jay |
| 2014/0241421 A1 | 8/2014 | Orton-Jay |
| 2014/0270330 A1 | 9/2014 | Pometun |
| 2014/0341276 A1 | 11/2014 | Lee |
| 2014/0348227 A1* | 11/2014 | Lee ............ H04N 19/463 375/240.03 |
| 2017/0118484 A1 | 4/2017 | Maeda |

OTHER PUBLICATIONS

ISO/IEC 14496-10 (MPEG-4 Part10: Advanced Video Coding), Oct. 1, 2004.

L. Dong et al., "CU Adaptive Quantization Syntax Change for Better Decoder pipelining", Joint Collaborative Team on Video Coding (JCT-VC) of ITU-T SG16 WP3 and ISO/IEC JTC1/SC29/WG11, JCTVC-D258, 4th Meeting: Daegu, KR, Jan. 20-28, 2011.

Madhukar Budagavi et al., "Delta QP signaling at sub-LCU level", Joint Collaborative Team on Video Coding (JCT-VC) of ITU-T SG16 WP3 and ISO/IEC JTC1/SC29/WG11, JCTVC-D038, 4th Meeting: Daegu, KR, Jan. 20-28, 2011.

Zhang et al., "Video Coding with Optimal Inter/Intra-Mode Switching for Packet Loss Resilience," IEEE Journal of Selected Areas In Communications, vol. 18, No. 6, Jun. 2000.

* cited by examiner

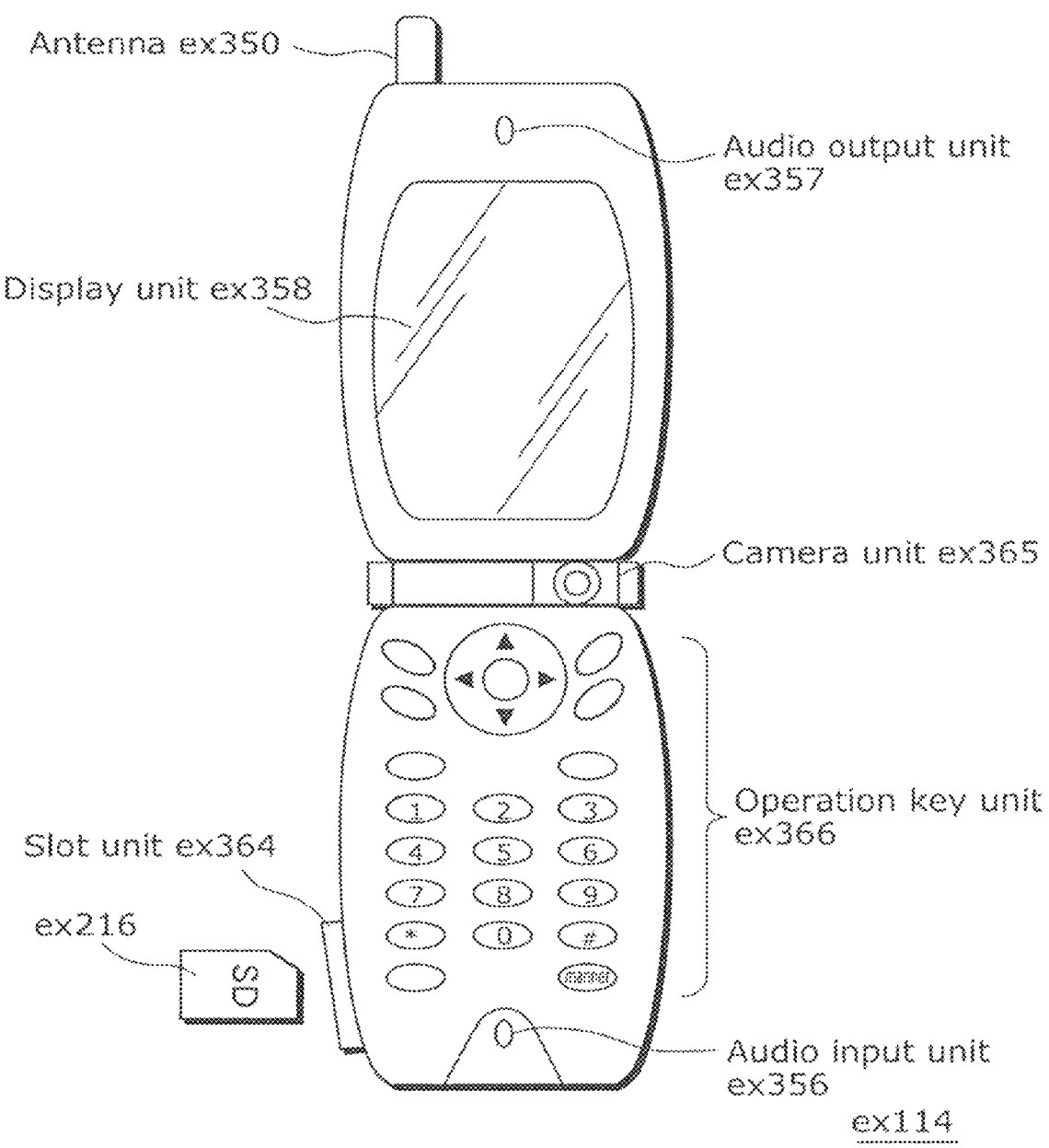

Fig. 30
| Corresponding standard | Driving frequency |
|---|---|
| MPEG-4 AVC | 500 MHz |
| MPEG-2 | 350 MHz |
| ⋮ | ⋮ |
Fig. 31A
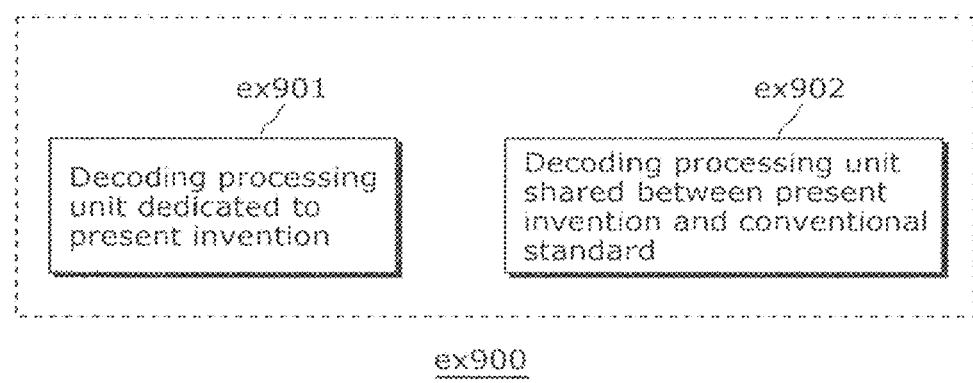
Fig. 31B
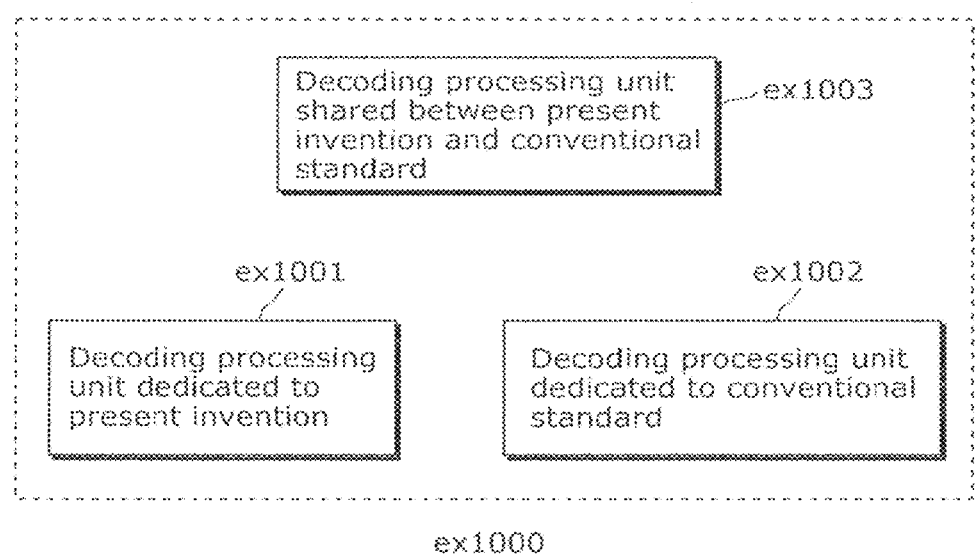

METHOD OF ENCODING AN IMAGE INTO A CODED IMAGE, METHOD OF DECODING A CODED IMAGE, AND APPARATUSES THEREOF

TECHNICAL FIELD

The present invention relates to a method of encoding an image into a coded image, a method of decoding a coded image, and apparatuses thereof. The present invention can be applied in any multimedia data coding and, more particularly, in High Efficiency Video Coding (HEVC).

BACKGROUND ART

In previous video coding standards like MPEG-1, MPEG-2, MPEG-4 or MPEG-4 AVC, a compressed picture is usually divided into a number of rectangle units known as macroblocks or coding units. A macroblock is usually defined as a two dimensional block of image samples of 16 pixels by 16 pixels for luminance (or luma) samples. For each macroblock, the compression ratio for the macroblock is controlled by a quantization parameter (or quantization scale parameter) and the quantization parameter is usually coded in a header of the macroblock. The value of the quantization parameter coded in the header of the macroblock is usually expressed as a differential value with respect to the quantization parameter of the previous macroblock in coding order. The quantization parameter expressed in such a differential value may be referred to as a delta quantization parameter.

Similarly in the previous video coding standards, the prediction coding type parameter, which indicates if the prediction samples for a block of image samples (i.e., a macroblock) are spatially predicted (intra predicted) or inter picture predicted (inter predicted), is also signalled in the units of a macroblock.

FIG. 1 depicts a diagram illustrating a largest coding unit (LCU) 102 comprising coding units (CUs) 104 coded based on the latest video coding standards that support variable size coding units, for example, High Efficiency Video Coding (HEVC). As shown, a coding unit 104 can be coded as an intra predicted block (depicted as shaded blocks) 106 or an inter prediction block (depicted as unshaded blocks) 108. In the example shown in FIG. 1, the prediction mode type parameter 110 for signalling or indicating whether a coding unit 104 is an intra predicted or inter predicted block is coded at a smaller coding unit than the coding unit 102 carrying the delta quantization parameter 112. That is, as depicted in FIG. 1, the delta quantization parameter 112 is coded at the LCU level (e.g., a header of the LCU 102) whereas the prediction mode type 110 is coded at the CU level (e.g., a header of the CU 104). However, since the delta quantization parameter 112 can only be signalled at the LCU level, this means that all the coding units 104 within the LCU 102 must share the same quantization parameter 112.

It is against this background that the present invention has been developed.

CITATION LIST

Non Patent Literature

[NPL 1]
ISO/IEC 14496-10, "MPEG-4 Part 10 Advanced Video Coding"

SUMMARY OF INVENTION

Technical Problem

As discussed in the background, in the latest video standards that support variable size coding unit, such as HEVC, the inter predicted coding unit(s) and intra predicted coding unit(s) within the same largest coding unit (LCU) have to use the same quantization parameter because the delta quantization parameter can only be signalled at the LCU level. The inventors have discovered that this results in a problem leading to inefficiencies in coding the LCU. In particular, since the inter predicted coding unit(s) and intra predicted coding unit(s) within the same LCU have to use the same quantization parameter, the quantization parameter for the inter predicted coding unit(s) has to be lowered to match the quantization parameter for the intra predicted coding unit(s) because the intra predicted coding unit(s) within the same largest coding unit requires a lower quantization parameter. As a result, the quantization parameter for the inter predicted coding is lowered unnecessarily which, for example, leads to an undesirable increase in the size of the LCU.

Solution to Problem

The inventors have recognized that as intra predicted coding units are spatially predicted and inter predicted coding units are inter-picture predicted, to achieve similar subjective quality, the intra predicted coding units require a lower quantization parameter than the inter predicted coding units. Therefore, to improve the subjective quality of an inter picture predicted image, without unnecessarily increasing the data size of the overall image as discussed in the background, the inventors have recognized that intra predicted coding units and inter predicted block coding units within the same LCU should use different quantization parameters instead of sharing the same quantization parameter.

To achieve this, according to an embodiment of the present invention, a method is introduced to signal a quantization offset parameter to offset the delta quantization parameter for all the intra predicted coding units within, for example, a LCU or slices of the pictures or coded video bitstream. With this signalling, an intra predicted coding unit of a picture or LCU can have a lower quantization parameter than the inter predicted block of the same picture or LCU, thereby overcoming a problem with the prior art where intra predicted coding units and inter predicted block coding units within the same LCU must share the same quantization parameter. Furthermore, this can be achieved without explicitly signalling a delta quantization parameter to change the quantization parameter between inter and intra predicted coding units.

According to a first aspect of the present invention, there is provided a method of encoding an image into a coded image, the method comprising:

writing a quantization offset parameter into the coded image, determining a prediction mode type for coding a block of image samples of the image into a coding unit of the coded image, determining a quantization parameter for the block of image samples, and determining if the prediction mode type is of a predetermined type, wherein if the prediction mode type is of the predetermined type, the method further comprises:
 modifying the determined quantization parameter using the quantization offset parameter, and
 performing a quantization process for the block of image samples using the modified quantization parameter, and
wherein if the prediction mode type is not of the predetermined type, the method further comprises:
 performing a quantization process for the block of image samples using the determined quantization parameter.

The step of modifying the determined quantization parameter may comprise subtracting from the determined quantization parameter a value of the quantization offset parameter.

The step of writing the quantization offset parameter may comprise writing the quantization offset parameter in one of a slice header, a picture header and a sequence header.

The method may further comprise writing a prediction mode type parameter indicating the determined prediction mode type in a header of the coding unit.

The method may further comprise:
determining a delta quantization parameter, and
writing the delta quantization parameter into the header of the coding unit,
wherein the delta quantization parameter represents a value determined by subtracting from a quantization parameter of a previous coding unit a value of the determined quantization parameter.

The previous coding unit may be defined as a coding unit immediately before the coding unit in accordance with a coding order of the coded image.

The coding units of the coded image may be represented in a quad-tree structure, and the previous coding unit may alternatively be defined as a coding unit located at an immediate left of the coding unit based on the quad-tree structure, regardless of a coding order of the coded image.

Preferably, the predetermined type of prediction mode is an intra prediction mode.

Preferably, the coded image comprises a largest coding unit including a plurality of coding units, and the quantization offset parameter is determined based on a desired difference in the level of quantization between the coding units coded by the intra prediction mode and the coding units coded by another type of prediction mode within the largest coding unit.

Said another type of prediction mode may be an inter-picture prediction mode.

According to a second aspect of the present invention, there is provided a method of decoding a coded image, the method comprising:
 retrieving a quantization offset parameter from the coded image,
 retrieving a prediction mode type of a coding unit of the coded image,
 determining a quantization parameter for the coding unit, and
 determining if the prediction mode type is of a predetermined type,
wherein if the prediction mode type is of the predetermined type, the method further comprises:
 modifying the determined quantization parameter using the quantization offset parameter, and
 performing an inverse quantization process for the coding unit using the modified quantization parameter, and
wherein if the prediction mode type is not of the predetermined type, the method further comprises:
 performing an inverse quantization process for the coding unit using the determined quantization parameter.

The step of modifying the determined quantization parameter may comprise subtracting from the determined quantization parameter a value of the quantization offset parameter.

The step of retrieving the quantization offset parameter may comprise retrieving the quantization offset parameter from one of a slice header, a picture header and a sequence header.

Preferably, the coding unit comprises a transform unit, and the method further comprises determining whether the transform unit is coded,
 wherein if the transform unit is determined to be coded, the method further comprises retrieving a delta quantization parameter for the coding unit from a header of the coding unit, and
 wherein if the transform unit is determined to be not coded, the method further comprises setting a delta quantization parameter for the coding unit having a value of zero.

The step of determining the quantization parameter may comprise summing the delta quantization parameter and the quantization parameter of a previous coding unit.

The previous coding unit may be defined as a coding unit immediately before the coding unit in accordance with a coding order of the coded image.

The coding units of the coded image may be represented in a quad-tree structure, and the previous coding unit may alternatively be defined as a coding unit located at an immediate left of the coding unit based on the quad-tree structure, regardless of a coding order of the coded image.

The step of retrieving the prediction mode type may comprise retrieving the prediction mode type from the header of the coding unit.

Preferably, the predetermined type of prediction mode is an intra prediction mode.

Preferably, the coded image comprises a largest coding unit including a plurality of coding units, and the quantization offset parameter is determined based on a desired difference in the level of quantization between the coding units coded by the intra prediction mode and the coding units coded by another type of prediction mode within the largest coding unit.

Said another type of prediction mode may be an inter-picture prediction mode.

According to a third aspect of the present invention, there is provided an apparatus for encoding an image into a coded image, the apparatus comprising:
 a writing unit for writing a quantization offset parameter into the coded image,
 a prediction mode type decision unit for determining a prediction mode type for coding a block of image samples of the image into a coding unit of the coded image,
 a quantization parameter determining unit for determining the quantization parameter for the block of image samples,
 a quantization parameter computing unit for determining if the prediction mode type is of a predetermined type, and
 a quantization unit for performing a quantization process for the block of image samples, wherein if the prediction mode type is of the predetermined type,
the quantization parameter computing unit is configured to modify the determined quantization parameter using the quantization offset parameter, and
the quantization unit is operable to perform the quantization process for the block of image samples using the modified quantization parameter, and
wherein if the prediction mode type is not of the predetermined type, and
the quantization unit is operable to perform the quantization process for the block of image samples using the determined quantization parameter.

According to a fourth aspect of the present invention, there is provided an apparatus for decoding a coded image, the apparatus comprising:
a parsing unit for retrieving a quantization offset parameter from the coded image,
a decoding unit for retrieving a prediction mode type parameter from a coding unit of the coded image,
a quantization parameter determining unit for determining a quantization parameter for the coding unit,
a quantization parameter computing unit for determining if the prediction mode type is of a predetermined type, and
an inverse quantization unit for performing an inverse quantization process for the coding unit,
wherein if the prediction mode type is of the predetermined type,
the quantization parameter computing unit is configured to modify the determined quantization parameter using the quantization offset parameter, and
the inverse quantization unit is operable to perform an inverse quantization process for the coding unit using the modified quantization parameter, and
wherein if the prediction mode type is not of the predetermined type,
the inverse quantization unit is operable to perform an inverse quantization process for the coding unit using the determined quantization parameter.

Advantageous Effects of Invention

Embodiment(s) of the present invention allows signalling of a quantization offset parameter to offset the quantization parameter for intra predicted coding unit. For example, this can reduce the overhead of signalling delta quantization parameter at the coding unit level as well as reducing the number of bits required and improving coding efficiency.

BRIEF DESCRIPTION OF DRAWINGS

FIG. 18A depicts a drawing illustrating an example of a cellular phone.

FIG. 30 depicts a drawing showing an example of a look-up table in which the standards of video data are associated with the driving frequencies according to an embodiment of the present invention;

FIG. 31A depicts a drawing showing an example of a configuration for sharing a module of a signal processing unit; and FIG. 31B depicts a drawing showing another example of a configuration for sharing a module of a signal processing unit according to an embodiment of the present invention.

DESCRIPTION OF EMBODIMENTS

According to exemplary embodiments of the present invention, there are provided a method of encoding an image into a coded image, a method of decoding a coded image, and apparatuses thereof.

Figure 1:
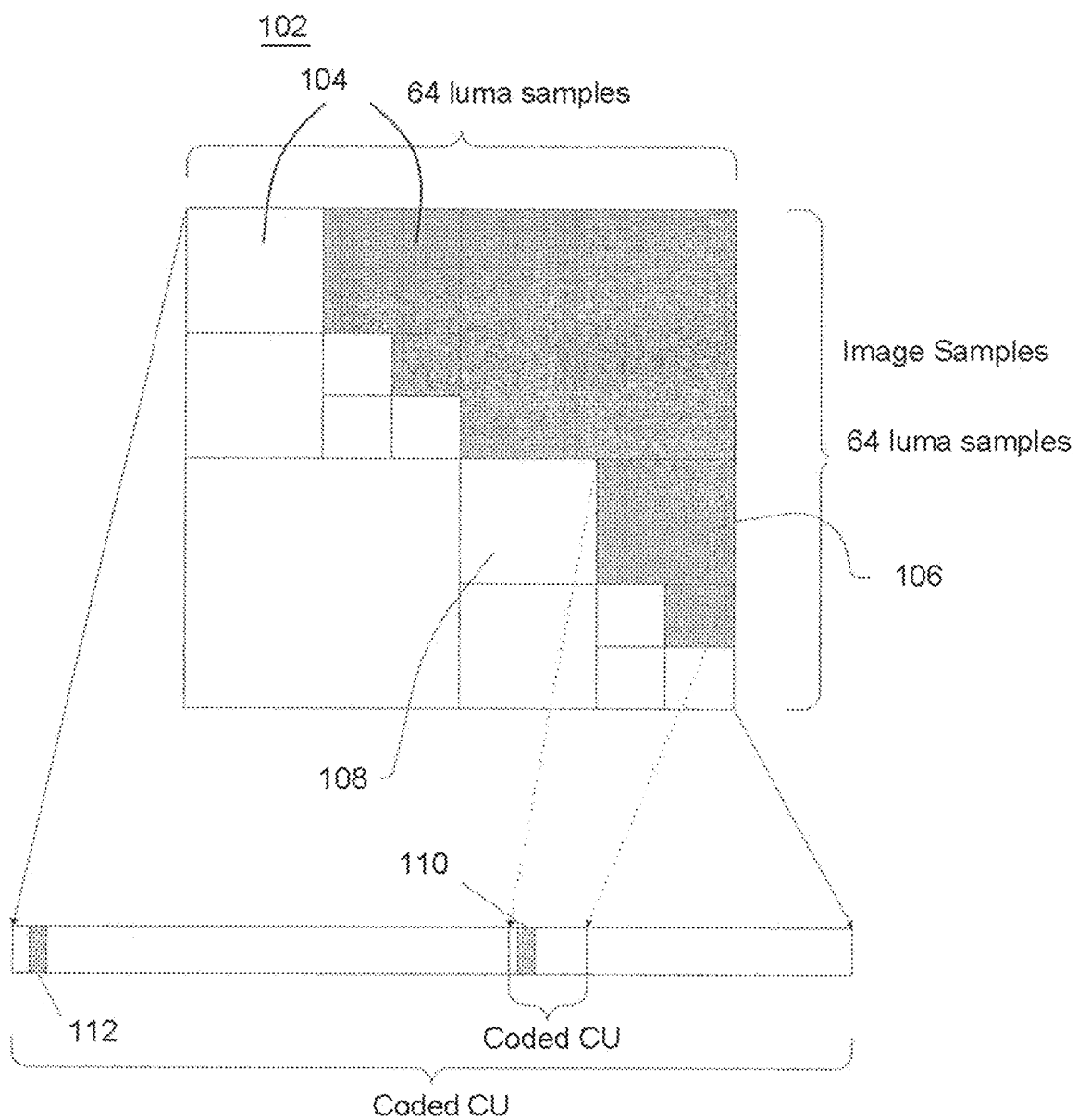
FIG. 1 depicts a diagram representation of an exemplary largest coding unit (LCU)

FIG. 1 depicts a diagram illustrating a largest coding unit (LCU) 102 comprising coding units (CUs) 104 coded based on the latest video coding standards that support variable size coding units, for example, High Efficiency Video Coding (HEVC). As shown, a coding unit 104 can be coded as an intra predicted block (depicted as shaded blocks) 106 or an inter prediction block (depicted as unshaded blocks) 108. As discussed in the background with reference to FIG. 1, based on prior art teaching, the delta quantization parameter (ΔQP(hereinafter referred to as DELTAQP)) 112 can only be signalled at the LCU level. This means that all of the coding units 104 within the LCU 102 must share the same quantization parameter (QP) 112.

The inventors have recognized that as intra predicted coding units 106 are spatially predicted and inter predicted coding units 108 are inter-picture predicted, to achieve similar subjective quality, the intra predicted coding units 106 require a lower QP than the inter predicted coding units 108. Therefore, to improve the subjective quality of an inter picture predicted image, without unnecessarily increasing the data size of the overall image as discussed in the background, the inventors have recognized that intra predicted coding units 106 and inter predicted block coding units 108 within the same LCU 102 should use different quantization parameters (QPs) instead of sharing the same QP 112.

To achieve this, according to an embodiment of the present invention, a method is introduced to signal a quantization offset parameter (offset QP) 306 to offset the DELTAQP 316 for all the intra predicted coding units within, for example, a LCU or slices 302 of the pictures or coded video bitstream. With this signalling, an intra predicted coding unit of a picture or LCU 308 can have a lower QP than the inter predicted block of the same picture or LCU 308, thereby overcoming a problem with the prior art where intra predicted coding units and inter predicted block coding units within the same LCU must share the same QP. Furthermore, this can be achieved without explicitly signalling a DELTAQP to change the QP between inter and intra predicted coding units.

Figure 2:
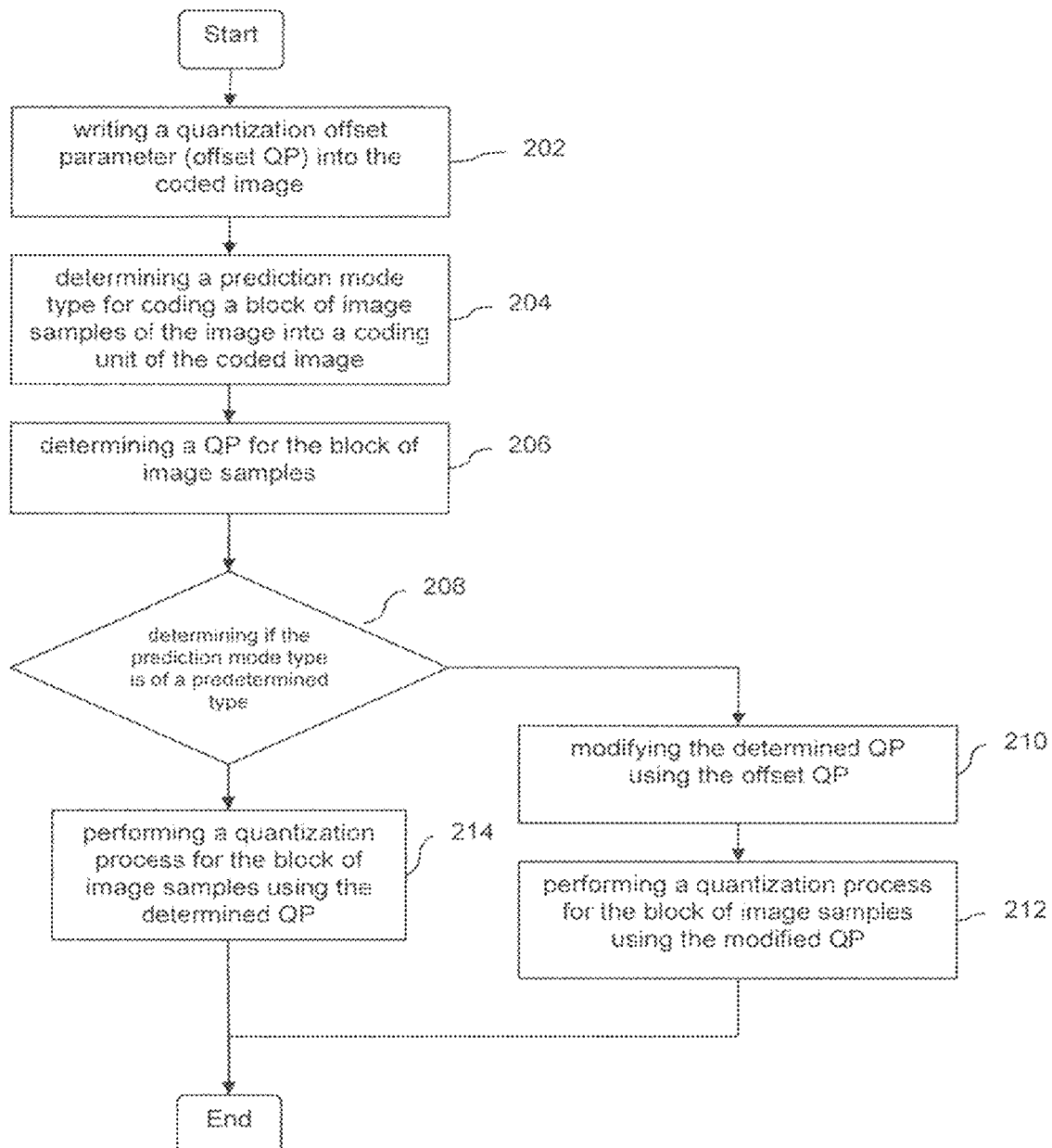
FIG. 2 depicts a flowchart illustrating a method of encoding an image into a coded image according to a first exemplary embodiment of the present invention.
Figure 3:
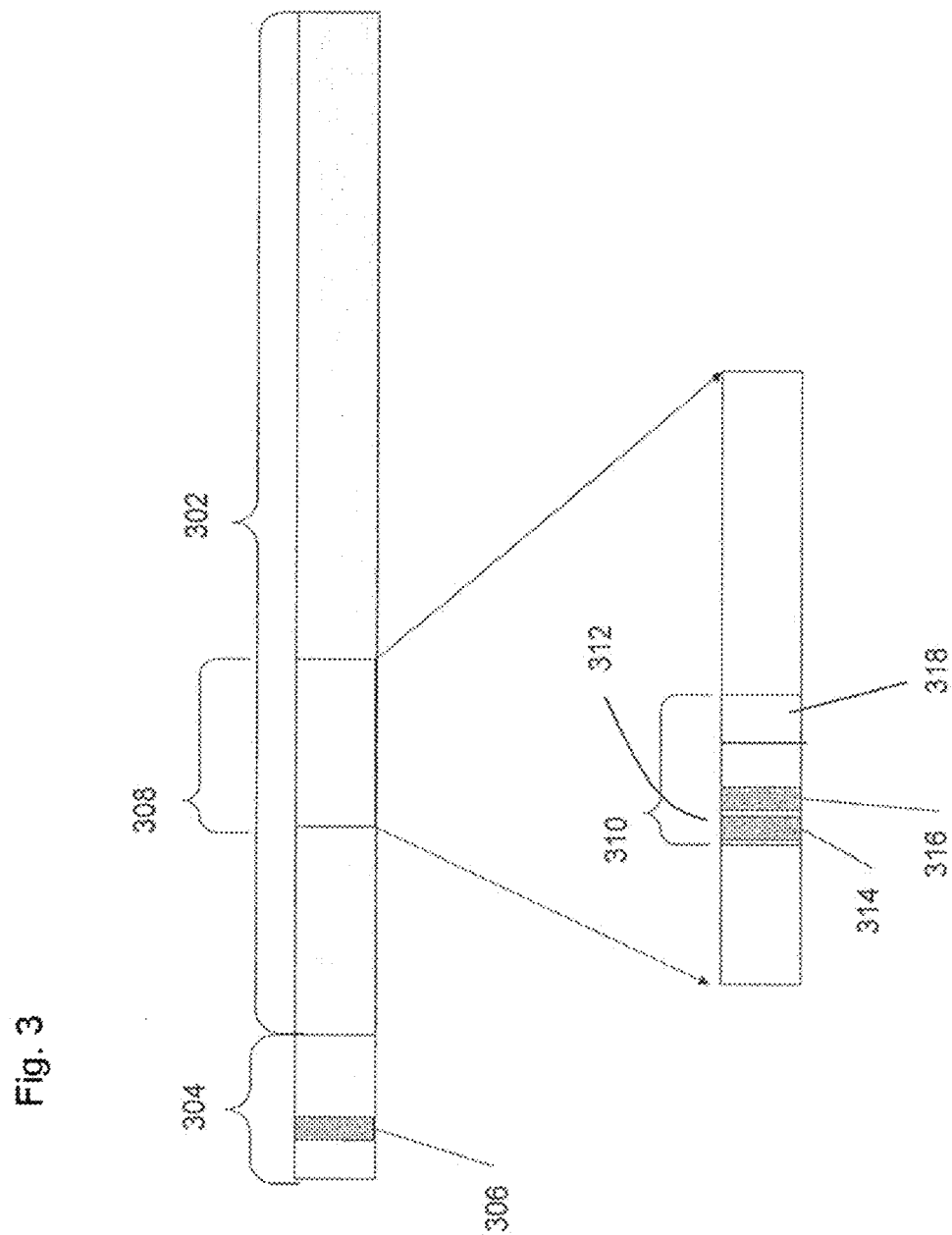
FIG. 3 depicts a diagram representation of a coded image according to embodiments of the present invention.
Figure 4:
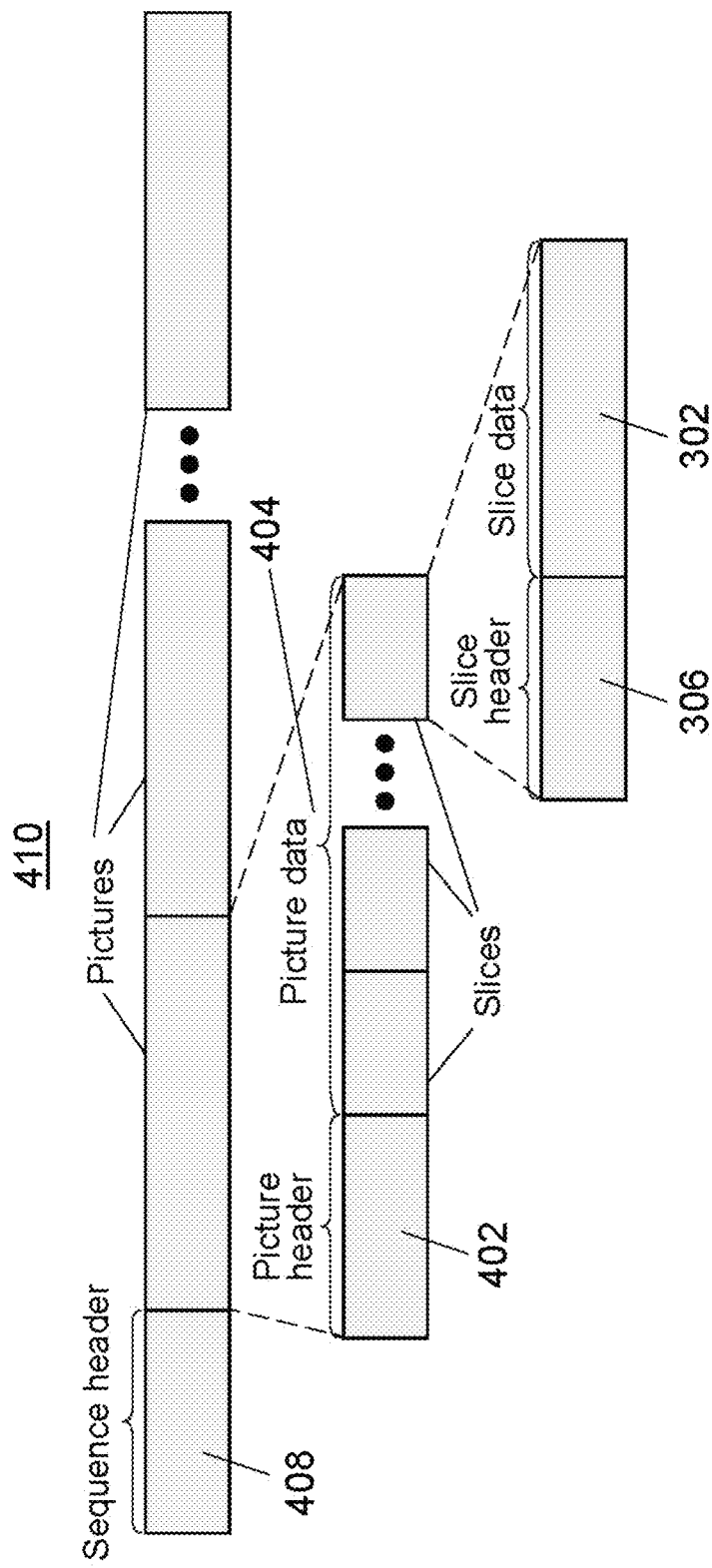
FIG. 4 depicts an exploded view diagram of a coded image according to embodiments of the present invention.

FIG. 2 depicts a flowchart illustrating a method of encoding an image into a coded image 410 according to a first exemplary embodiment of the present invention. As a first step 202, the method comprises writing an offset QP 306 into the coded image 410. For example, in the case of encoding images into a coded video bitstream 410, the offset QP 306 may be written into a header 304 (i.e., slice header) of a slice 302 of the coded video bitstream 410 as illustrated in FIG. 3. However, it will be apparent to the person skilled in the art that the offset QP 306 need not be written in the header 304 of the slice 302, and can alternatively be written in a picture header 402 or a sequence header 408. A picture header 402 is the header of a picture 404 (e.g., a plurality of slices), and a sequence header 408 is a header of the coded video bitstream 410 (e.g., a plurality of pictures). FIG. 4 depicts an exploded view diagram of the coded video bitstream 410 showing the exemplary locations of slice header 304, the picture header 402 and the sequence header 408 with respect to each other.

The method of encoding an image into a coded image 410 according to a first exemplary embodiment of the present invention further comprises a step 204 of determining a prediction mode type for coding a block of image samples of the image into a coding unit 310 of the coded image 410. For example, the prediction mode type can be an intra prediction mode or an inter-picture prediction mode. Existing techniques for deciding or determining a prediction mode type for coding a block of image are known in the art, and thus need not be described in any further details. In an embodiment, a prediction mode parameter 314 representing or indicating the determined prediction mode type is written into a header 312 of a coding unit 310 as shown in FIG. 3. By way of example only, a prediction mode parameter 314 having a value "0" may indicate that the prediction mode type is an intra prediction mode and a prediction mode parameter 314 having a value "1" may indicate that the prediction mode type is an inter-picture prediction mode. The method further comprises a step 206 of determining a QP for compressing the block of image samples. The QP for a block of image samples controls the compression ratio of the block of image samples. For example, a QP having a high value represents a high compression ratio (thus smaller data size but lower picture quality) and a QP having a low value represents a low compression ratio (thus larger data size but higher picture quality). Existing techniques for deciding or determining a QP for the block of image samples are known in the art, and thus need not be described in any further details. In an embodiment, after a QP for the block of image samples is determined, a DELTAQP 316 (being the difference between the determined QP and a QP of a previous coding unit) is written into the header 312 of the coding unit 310.

Subsequently, in step 208, it is determined whether the prediction mode parameter 314 representing a prediction mode type for the block of image samples is of (or matches) a predetermined prediction mode type. In an embodiment, the predetermined prediction mode type is an intra prediction mode and can for example be represented or indicated by a value "0" as described hereinbefore.

In the case where the prediction mode type for the block of image samples matches the predetermined prediction mode type, in step 210, the determined QP is modified using the offset QP 306. For example, if the prediction mode type for the block of image samples is an intra prediction mode type, the determined QP for compressing the block of image samples is modified by subtracting from it the value of the offset QP 306. For example, if the determined QP has a value "5", the offset QP has a value "3", and an intra prediction mode type for the block of image samples is detected, the determined QP is modified to have a value "2" (i.e., "5" minus "3"="2"). That is, modified QP=determined QP−offset QP when the detected prediction mode type is an intra prediction mode type. However, since the determined QP can be expressed as DELTAQP+QP of a previous CU, the above equation can equivalently be expressed as: modified QP=DELTAQP+QP of a previous CU−offset QP. It will be apparent to the person skilled in the art that the above equation can equivalently be expressed as: modified QP=determined QP+offset QP (or modified QP=DELTAQP+QP of previous CU+offset QP) if the offset QP is expressed as a negative value or number. With the modified QP, in step 112, a quantization process on the block of image samples is performed using the modified QP to generate a coding unit 310.

In the case where the prediction mode type for the block of image samples does not match the predetermined prediction mode type, in step 214, a quantization process on the block of image samples is performed using the determined QP to generate a coding unit 310.

In an embodiment, the offset QP 306 is determined based on a desired difference in the level of quantization between the coding units 310 coded by one prediction mode type (e.g., intra prediction coding units) and the coding units 310 coded by another prediction mode type. For example, in the case where the predetermined prediction mode type is an intra prediction mode, the offset QP 306 is determined based on a desired difference in the level of quantization between the coding units 310 coded by the intra prediction mode (i.e., intra prediction coding units) and the coding units 310 coded by another prediction mode type such as the inter picture prediction mode.

Figure 5:
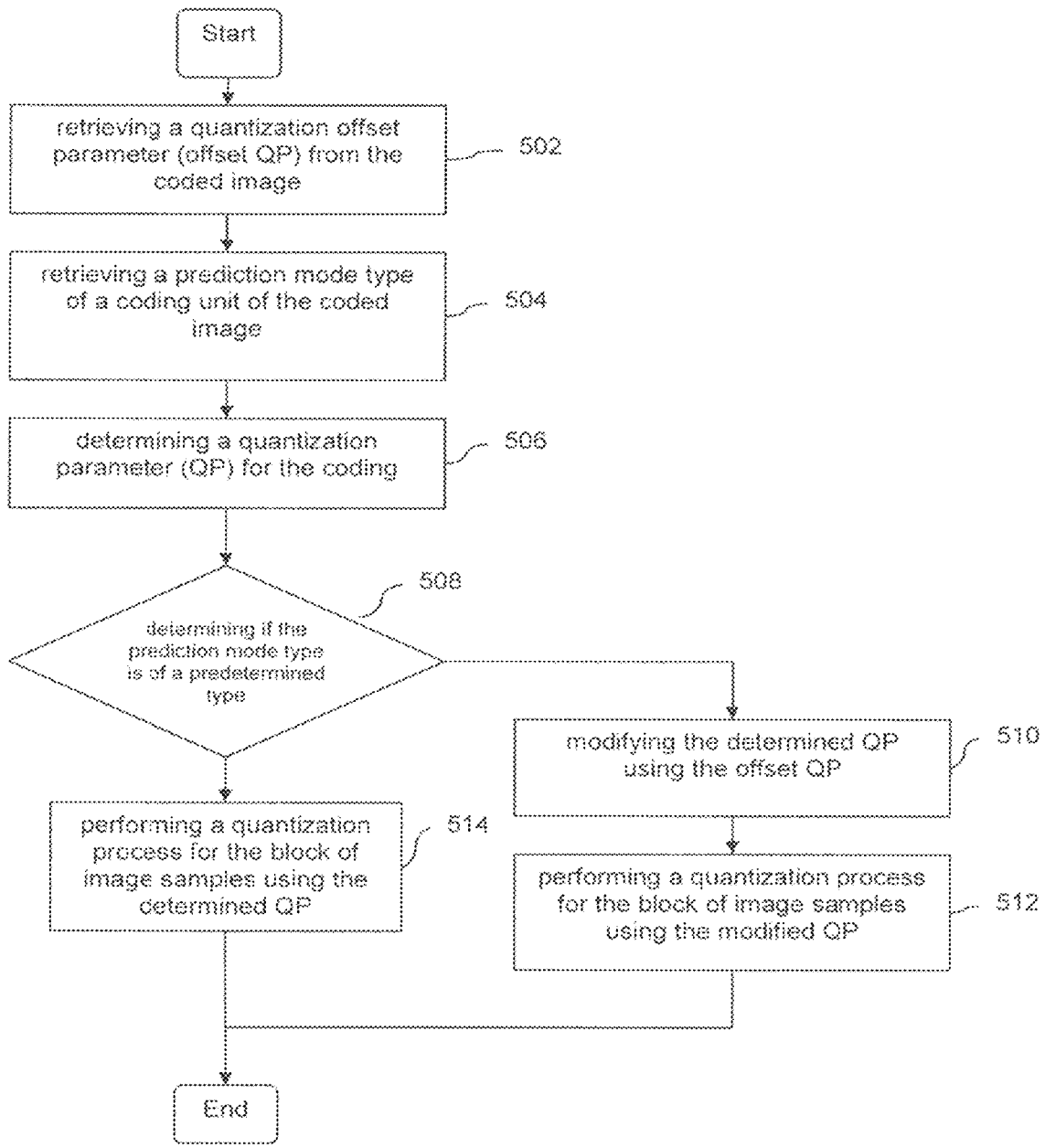
FIG. 5 depicts a flowchart illustrating a method of decoding a coded image according to the first exemplary embodiment of the present invention.

FIG. 5 depicts a flowchart illustrating a method of decoding a coded image 410 according to the first exemplary embodiment of the present invention. As a first step 502, the method comprises parsing or retrieving a quantization offset parameter (offset QP) 306 from the coded image 410. As described hereinbefore, for example, the offset QP 306 may be located in a header 304 (i.e., slice header) of a slice 302 of the coded video bitstream 410 as illustrated in FIG. 3. Alternatively, the offset QP may be located in a picture header 402 or a sequence header 408 as illustrated in FIG. 4.

The method of decoding a coded image 410 further includes a step 504 of parsing or retrieving a prediction mode type parameter 314 from a coding unit 310 of the coded image 410. For example, as described hereinbefore, the prediction mode type parameter 314 represents or indicates a prediction mode type of the coding unit 310 and can be an intra prediction mode or an inter-picture prediction mode. In the embodiment, the prediction mode parameter 314 is located in a header 312 of the coding unit 310 as shown in FIG. 3. By way of example only, a prediction mode parameter 314 having a value "0" may indicate that the prediction mode type is an intra prediction mode and a prediction mode parameter 314 having a value "1" may indicate that the prediction mode type is an inter-picture prediction mode. The method further includes a step 506 of determining a QP for decompressing/decoding the coding unit 310. For example, the QP for the current coding unit 310 is determined by summing the DELTAQP of the current coding unit 310 with the QP of a previous coding unit. In this case, as shown in FIG. 3, the DELTAQP 316 for the current coding unit 310 can be retrieved or parsed from a header 312 of the current coding unit 310. That is, the QP of current coding unit=DELTAQP of the current coding unit+the QP of a previous coding unit.

Subsequently, in step 508, it is determined whether the prediction mode type of the coding unit 310 (i.e., the prediction mode type indicated or represented by the retrieved prediction mode type parameter 314) is of (or matches) a predetermined prediction mode type. In an embodiment, as described hereinbefore, the predetermined prediction mode type is an intra prediction mode and can for example be represented or indicated by a value "0".

In the case where the prediction mode type for the coding unit 310 matches the predetermined prediction mode type, in step 510, the determined QP for the coding unit 310 is modified using the offset QP 306. For example, if the prediction mode type of the coding unit 310 is an intra prediction mode type, the determined QP for decompressing/decoding the coding unit 310 is modified by subtracting from it the value of the offset QP. For example, if the determined QP has a value "5", the offset QP has a value "3", and an intra prediction mode type for the coding unit 310 is detected, the determined QP is modified to have a value "2" (i.e., "5" minus "3"="2"). That is, as described hereinbefore, modified QP=determined QP−offset QP. Alternatively, since the determined QP can be expressed as DELTAQP+QP of a previous coding unit, the above equation can equivalently be expressed as: modified QP=DELTAQP+QP of a previous CU−offset QP. It will be apparent to the person skilled in the art that the above equation can equivalently be expressed as: modified QP=determined QP+offset QP (or modified QP=DELTAQP+QP of previous CU+offset QP) if the offset QP is expressed as a negative value or number. With the modified QP, in step 512, an inverse quantization process on the coding unit 310 is performed using the modified QP in decoding the coding unit 310.

In the case where the prediction mode type for the coding unit 310 does not match the predetermined prediction mode type, in step 514, an inverse quantization process on the coding unit 310 is performed using the determined QP in decoding the coding unit 310.

An apparatus for encoding an image into a coded image according to the first exemplary embodiment of the present invention comprises a writing unit, a prediction mode type decision unit, a QP determining unit, a QP computing unit and a quantization unit. The writing unit is configured to write or embed a quantization offset parameter into the coded image. For example, as described hereinbefore, the offset QP may be written into a header 304 of a slice 302 of the coded video bitstream 410. The prediction mode type decision unit is configured to determine a prediction mode type parameter representing a prediction type (e.g., an intra prediction mode or an inter-picture prediction mode) for coding the block of image samples into a coding unit of the coded image. The QP determining unit is configured to determine a QP for compressing the block of image samples. The QP computing unit is configured to determine whether the prediction mode type is of a predetermined type. If the prediction mode type is of the predetermined type, the QP computing unit is configured to modify the determined QP using the offset QP in a manner as described hereinbefore. If the prediction mode type is not of the predetermined type, the QP computing unit is configured to output the determined QP without any modification. The quantization unit is configured to perform the quantization process using either the modified QP or the determined QP output from QP computing unit depending on the prediction mode type of the block of image samples.

An apparatus for decoding a coded image 510 according to the first exemplary embodiment of the present invention comprises a parsing or retrieving unit, a decoding unit, a QP determining unit, a QP computing unit and an inverse quantization unit. The parsing unit is configured to retrieve an offset QP 306 from the coded image 410. The decoding unit is configured to retrieve a prediction mode type parameter 314 of a coding unit 310 of the coded image 410 which for example indicates whether the coding unit is coded by an intra prediction mode or an inter-picture prediction mode. The QP determining unit is configured to determine a QP for decoding/decompressing the coding unit 310. For example, the QP may be determined by summing the DELTAQP of the current coding unit 310 and the QP of a previous coding unit. The QP computing unit is configured to determine whether the prediction mode type of the coding unit 310 (i.e., the prediction mode type indicated or represented by the retrieved prediction mode type parameter 314) is of a predetermined type. If the prediction mode type is of the predetermined type, the QP computing unit is configured to modify the determined QP using the offset QP in a manner as described hereinbefore. If the prediction mode type is not of the predetermined type, the QP computing unit is configured to output the determined QP without any modification. The quantization unit is configured to perform the quantization process using either the modified QP or the determined QP output from QP computing unit depending on the prediction mode type of the coding unit 310.

Further exemplary embodiments of the present invention will now be described hereinafter, providing more specific examples of the first exemplary embodiments of the present invention. It will be appreciated to the person skilled in the art that the exemplary embodiments described hereinafter are merely provided by way of examples and do not restrict the scope of the present invention.

Figure 6:
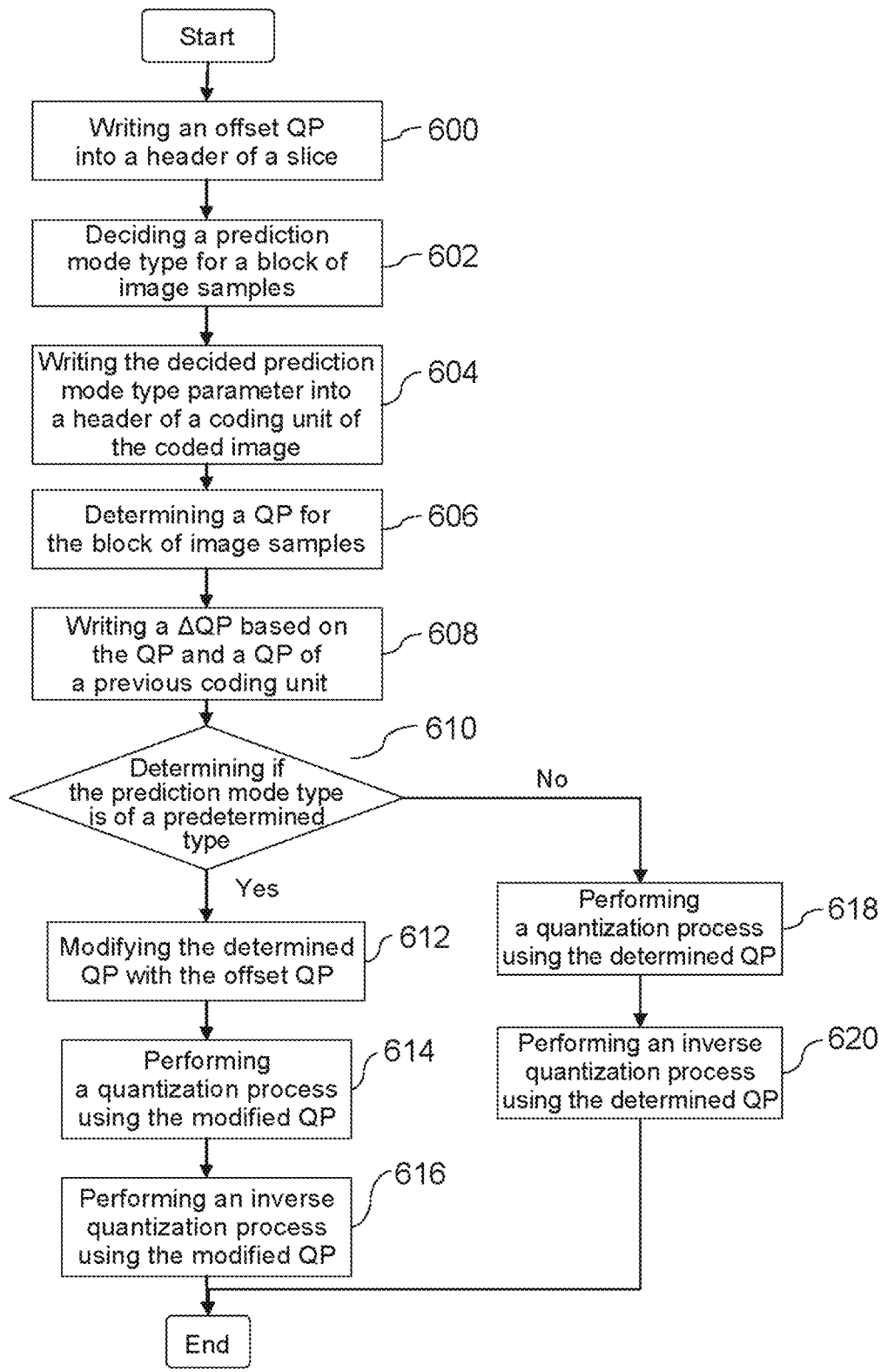
FIG. 6 depicts a flowchart illustrating a method of encoding an image into a coded image according to a second exemplary embodiment of the present invention.

FIG. 6 depicts a flowchart illustrating a method of encoding an image into a coded image 410 according to a second exemplary embodiment of the present invention. As shown in FIG. 6, in step 600, a quantization offset parameter (offset QP) is written into a header 304 of a slice 302 of the coded image 410. Next in step 602, a prediction mode type for coding a block of image samples is decided. For example, the prediction mode type can be an intra prediction mode or an inter-picture prediction mode. Subsequently in step 604, a prediction mode type parameter representing or indicating the decided prediction mode type is written into a header 312 of the coding unit 310. After step 604, a quantization parameter (QP) is decided for the block of image samples in step 606 and a delta quantization parameter (DELTAQP), being the difference between the decided QP and a QP of a previous coding unit is written into the header 312 of the coding unit 310.

In step 610, the decided prediction mode parameter 314 is judged or compared to determine whether it has a predetermined or predefined value. An example of the predefined value is a value, such as "0", that represents the prediction mode as an intra prediction mode. If the prediction mode parameter has the predefined value, the decided quantization parameter is modified by subtracting from it the offset QP in step 612, and a quantization process followed by an inverse quantization process is performed using the modified quantization parameter in step 614 and 616, respectively. On the other hand, if prediction mode parameter does not have the predefined value, a quantization process followed by an inverse quantization process is performed using the decided quantization parameter in step 618 and 620, respectively.

Figure 7:
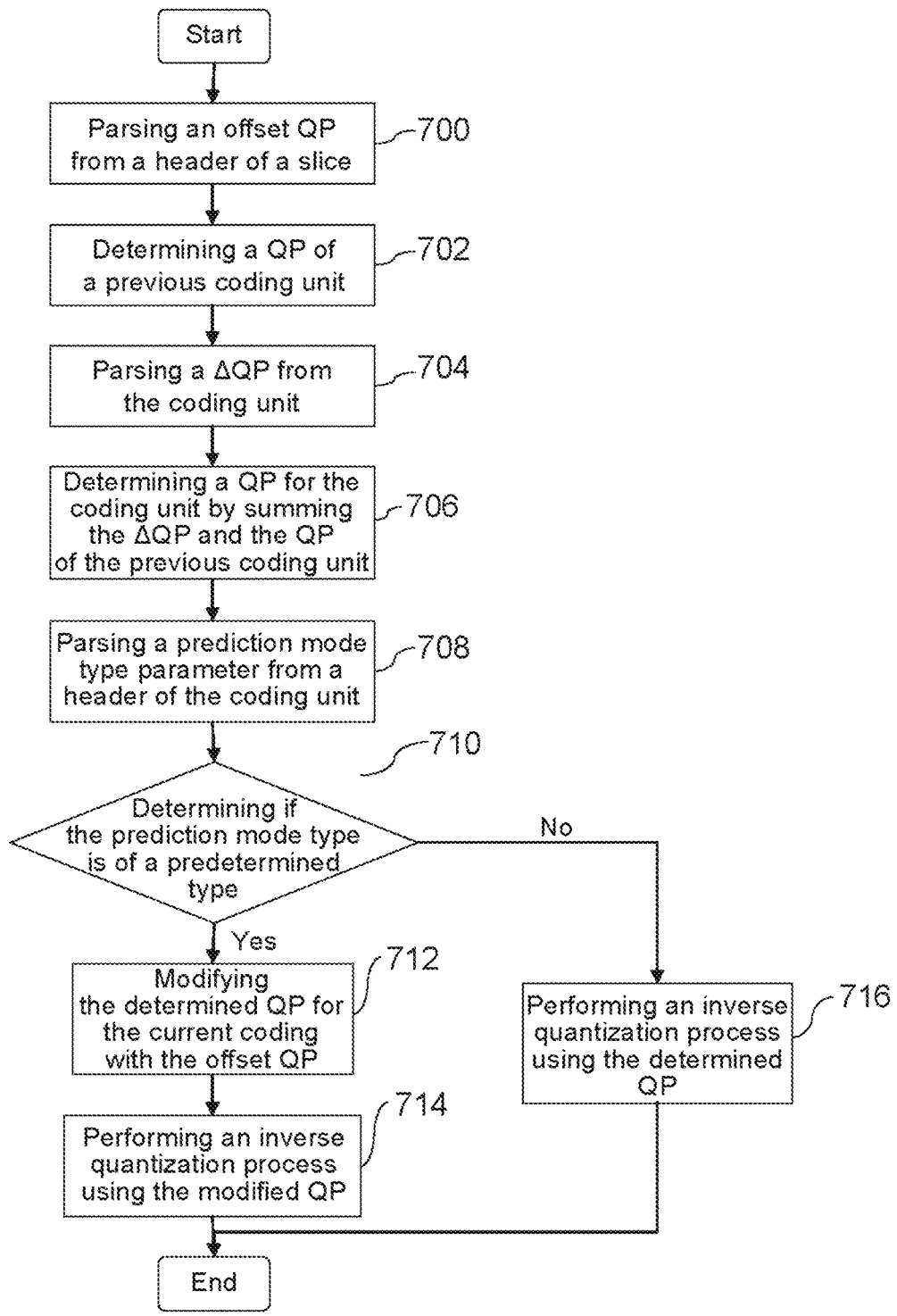
FIG. 7 depicts a flowchart illustrating a method of decoding a coded image according to the second exemplary embodiment of the present invention.

FIG. 7 depicts a flowchart illustrating a method or process for decoding a coded image 410 according to the second embodiment of the present invention. As shown in the flowchart, in step 700, an offset QP is first parsed from a header 304 of a slice 302 of the coded image. Then in step 702, a QP of a previous coding unit is retrieved or determined. Subsequently in step 704, a DELTAQP is parsed from a header 312 of a coding unit 310 and a QP for the coding unit 310 is determined by summing the QP of a previous coding unit and the parsed DELTAQP in step 706. Next in step 708, a prediction mode parameter 314 is parsed from a header 312 of the coding unit 310. The parsed prediction mode parameter 314 is then judged or compared to determine if it has a predefined value. As described hereinbefore, an example of the predefined value is a value, such as "0", that represents or indicates that the coding unit 310 is coded by an intra prediction mode. If the parsed prediction mode parameter has the predefined value, the determined QP is modified by subtracting from it the value of the parsed offset QP in step 712 and an inverse quantization process is performed using the modified QP in step 714. Otherwise, if the parsed prediction mode does not have the predefined value, an inverse quantization process is performed using the determined QP in step 716.

Figure 8:
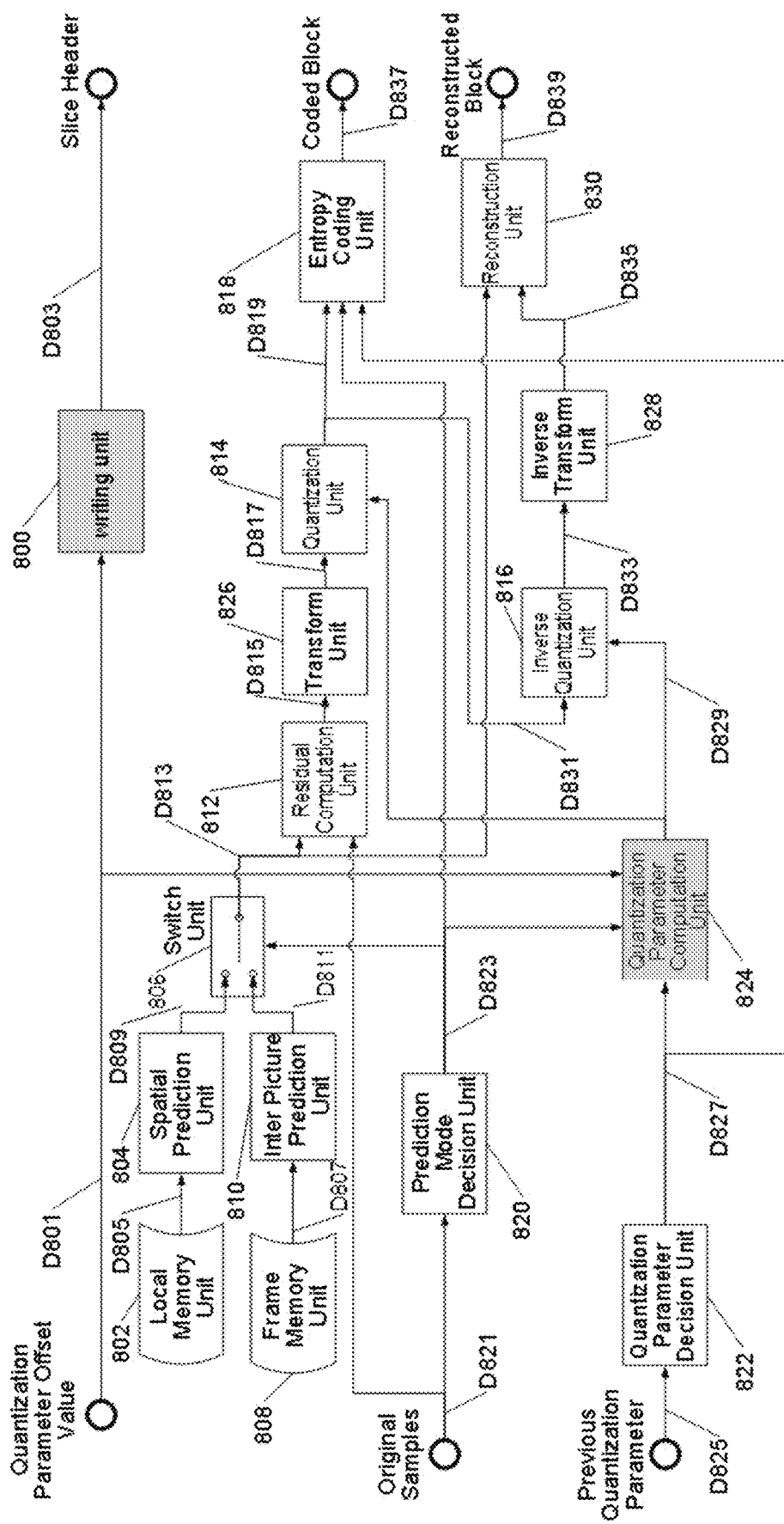
FIG. 8 depicts a block diagram illustrating an example apparatus for encoding an image into a coded image according to the second exemplary embodiment of the present invention.

FIG. 8 depicts a block diagram illustrating an example apparatus for encoding an image into a coded image 410 according to the second exemplary embodiment of the present invention. It will be apparent to the person skilled in the art that modifications can be made to the example apparatus shown in FIG. 8 to implement any one of the methods of encoding an image disclosed herein, including the method as described hereinbefore with reference to FIG. 2, or other methods without departing from the scope of the present invention. That is, the apparatus for encoding an image according to the present invention is not limited to the components/elements, and the interconnections thereof, as shown in FIG. 8 and can be modified accordingly for various purposes.

As shown in FIG. 8, the example apparatus includes a writing unit 800, a local memory unit 802, a spatial prediction unit 804, a switch unit 806, a frame memory unit 808, an inter-picture prediction unit 810, a residual computation unit 812, a quantization unit 814, an inverse quantization unit 816, an entropy coding unit 818, a prediction mode decision unit 820, a quantization parameter decision unit 822, a quantization parameter computation unit 824, a transform unit 826, an inverse transform unit 828 and a reconstruction unit 830.

The writing unit 800 is configured to read an offset QP D801 and writes the offset QP into a slice header D803 of a coded image. The prediction mode decision unit 820 is operable to read a block of image samples D821, decide or determine a prediction mode type for coding the block of image samples D821, and output the determined prediction mode type (or prediction mode parameter) D823. The switch unit 806 is configured to connect either the output D809 of the spatial prediction unit 804 or the output D811 of the inter picture prediction unit 810 to the residual computation unit 812 depending on the determined prediction mode type D823 from the prediction mode decision unit 820. The spatial prediction unit 804 is configured to read neighbour reconstructed samples D805 from a local memory unit 802 and output a block of predicted samples D809. The inter picture prediction unit 810 is configured to read reconstructed samples of previous pictures D807 from a frame memory unit 808 and output a block of predicted samples D811.

The quantization parameter (QP) decision unit 822 is configured to determine and output a QP D827 for compressing the block of image samples. For example, the QP may be determined based on a previous QP D825. The QP computation unit 824 is configured to read the determined QP D827, the prediction mode type parameter D823 and the offset QP D801 and output a modified QP D829 if the prediction mode type is of the predetermined type (e.g., intra prediction mode type) or the determined QP D829 without any modification if the prediction mode type is not of the predetermined type. As described hereinbefore, the modified QP D829 can be determined by subtracting the offset QP from the determined QP.

The residual computation unit 812 is configured to read the block of predicted samples D813 and the block of image samples D821 and output a block of residual samples D815. The transform unit 826 is configured to read the block of residual samples D815 and output a block of transformed coefficients D817. The quantization unit 814 is configured to read the block of transform coefficients D817 and the QP D829 (i.e., either the modified QP or the determined QP) from the QP computing unit 824 and output a block of quantized coefficients D819. The entropy coding unit 818 is configured to read the block of quantized coefficients D819, the prediction mode parameter D823 and the determined QP D827 and output a coded block D837. The inverse quantization unit 816 reads the QP D829 (i.e., either the modified QP or the determined QP) from the QP computing unit 824 and the block of quantized coefficients D819 and output a block of decoded transform coefficients D833. The inverse transform unit 828 is configured to read the block of transform coefficients D833 and output a block of decoded residuals D835. The reconstruction unit 830 is configured to read the block of decoded residuals D835 and the block of predicted samples D813 and output a block of reconstructed samples D839.

Figure 9:
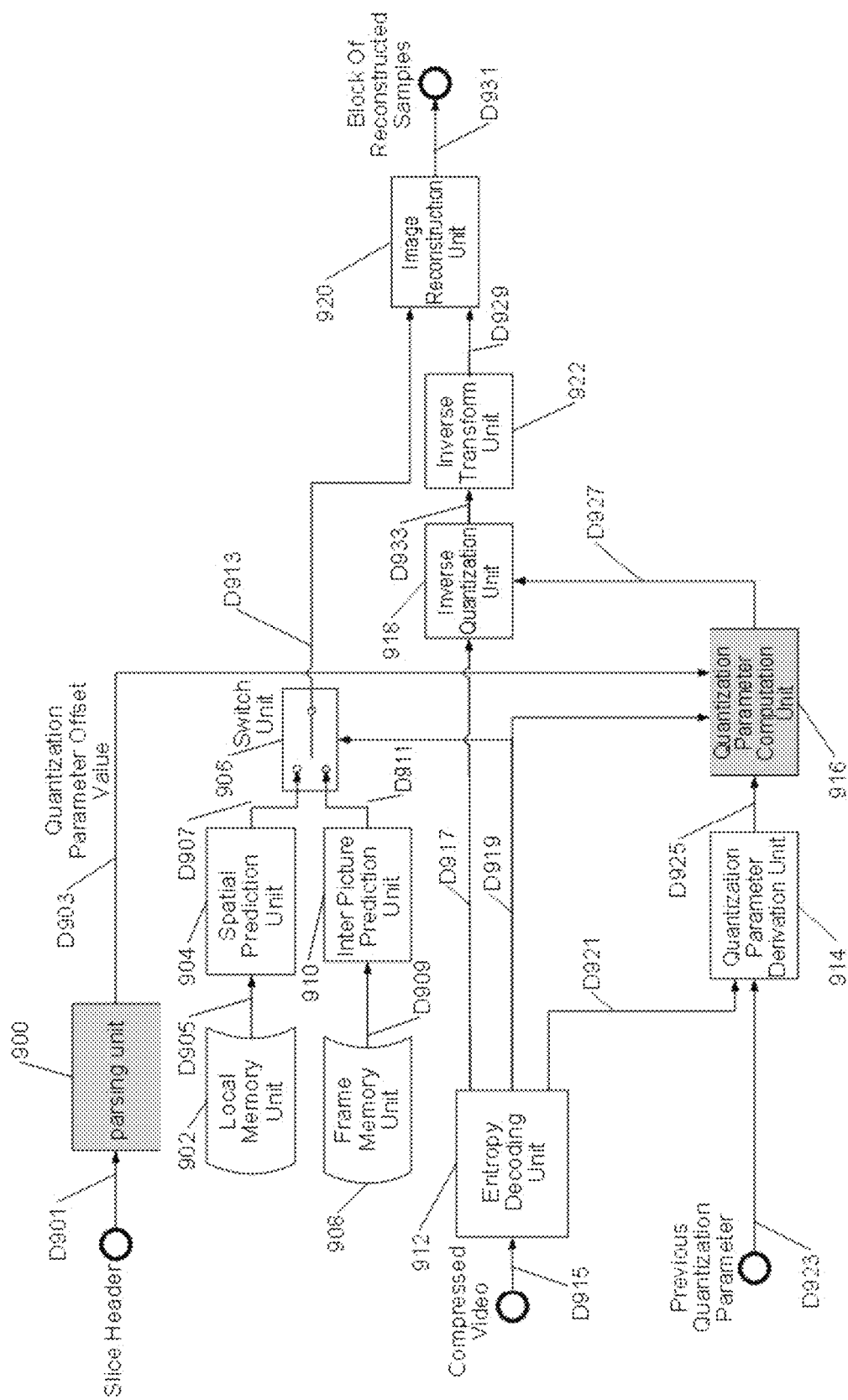
FIG. 9 depicts a block diagram illustrating an example apparatus for decoding a coded image according to the second exemplary embodiment of the present invention.

FIG. 9 depicts a block diagram illustrating an example apparatus for decoding a coded image according to the second exemplary embodiment of the present invention. It will be apparent to the person skilled in the art that modifications can be made to the example apparatus shown in FIG. 9 to implement any one of the methods of decoding a coded image disclosed herein, including the method as described hereinbefore with reference to FIG. 3, or other methods without departing from the scope of the present invention. That is, the apparatus for decoding a coded image according to the present invention is not limited to the components/elements, and the interconnections thereof, as shown in FIG. 9 and can be modified accordingly for various purposes.

As shown in FIG. 9, the apparatus includes a parsing unit 900, local memory unit 902, a spatial prediction unit 904, a switch unit 906, a frame memory unit 908, an inter-picture prediction unit 910, an inverse quantization unit 918, an entropy decoding unit 912, a quantization parameter derivation unit 914, a quantization parameter computation unit 916, an inverse transform unit 922 and a reconstruction unit 920.

The parser unit 900 is configured to read an offset QP D903 from a slice header D901. The entropy decoding unit 912 is configured to read a compressed image or video D915 and output a block of coefficients D917, a prediction mode type parameter D919 and a DELTAQP D921. The switch unit 906 is configured to output either the output D907 of the spatial prediction unit 904 or the output D911 of the inter picture prediction unit 910 depending on the determined prediction mode type D919 retrieved by the entropy decoding unit 612. The spatial prediction unit 904 is configured to read neighbour reconstructed samples D905 from a local memory unit 902 and output a block of predicted samples D907. The inter picture prediction unit 910 is configured to read reconstructed samples of previous pictures D909 from a frame memory unit 908 and output a block of predicted samples D911.

The quantization parameter (QP) derivation unit 914 is configured to determine and output a QP D925 based on a QP D923 of a previous coding unit and the decoded or retrieved DELTAQP D925. The quantization parameter (QP) computing unit 924 is configured to read the determined QP D925, the prediction mode type parameter D919 and the offset QP D903 and output a modified QP D927 if the prediction mode type is of the predetermined type (e.g., intra prediction mode type) or the determined QP D927 without any modification if the prediction mode type is not of the predetermined type. As described hereinbefore, the modified QP D927 can be determined by subtracting the offset QP from the determined QP.

The inverse quantization unit 918 is configured to read the QP D927 (i.e., either the modified QP or the determined QP) and the block of quantized coefficients D917 and output a block of decoded transform coefficients D933. The inverse transform unit 922 is configured to read the block of transform coefficients D933 and output a block of decoded residuals D929. The reconstruction unit 920 is configured to read the block of decoded residuals D929 and the block of predicted samples D913 and outputs a block of reconstructed samples D931.

Figure 10:
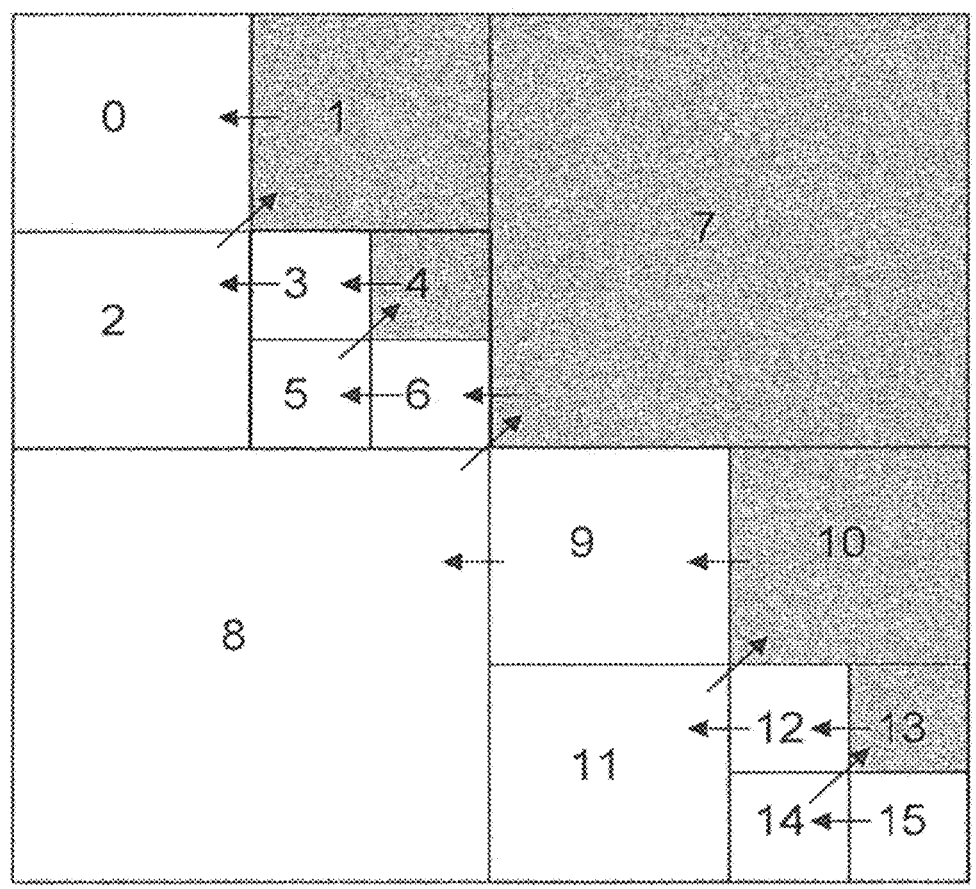
FIG. 10 depicts a diagram representation of a LCU with arrows denoting the previous coding unit according to an embodiment of the present invention.
Figure 11:
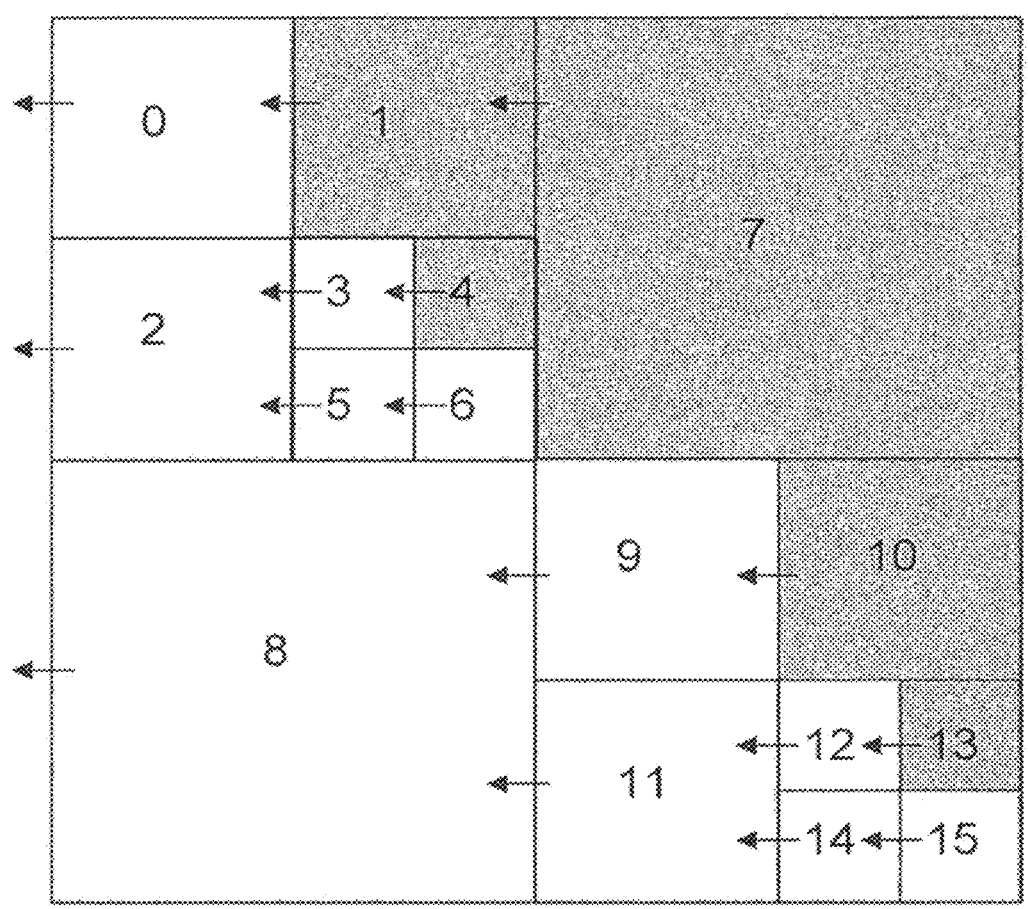
FIG. 11 depicts a diagram representation of a LCU with arrows denoting the previous coding unit according to another embodiment of the present invention.

As described hereinbefore, the determined QP for the current coding unit 310 is calculated by summing the DELTAQP of the current coding unit and the QP of a previous coding unit, i.e., determined QP=DELTAQP of the current CU+QP of a previous CU. In an embodiment, the previous coding unit is defined as a coding unit immediately before the current coding unit 310 in accordance with a coding order (e.g., Z-scan order) of the coded image 410. This is illustrated in FIG. 10 by way of example whereby the direction of the arrow denotes the previous coding unit. In a preferred embodiment, the coding units 310 of the coded image 410 are represented in a quad-tree structure, and the previous coding unit is defined as a coding unit located at an immediate left of the current coding unit 310 based on the quad-tree structure, regardless of the coding order. This is illustrated in FIG. 11 by way of example whereby the direction of the arrow denotes the previous coding unit. As shown in FIG. 11, in the event that there are more than one coding units (e.g., coding units "1", "4" and "6") at the immediate left of the current coding unit 310 (e.g., coding unit "7"), the coding unit at the first row (i.e., the top coding unit) is determined as the previous coding unit. In this example, coding unit "1" is determined as the previous coding unit of coding unit "7".

Figure 12:
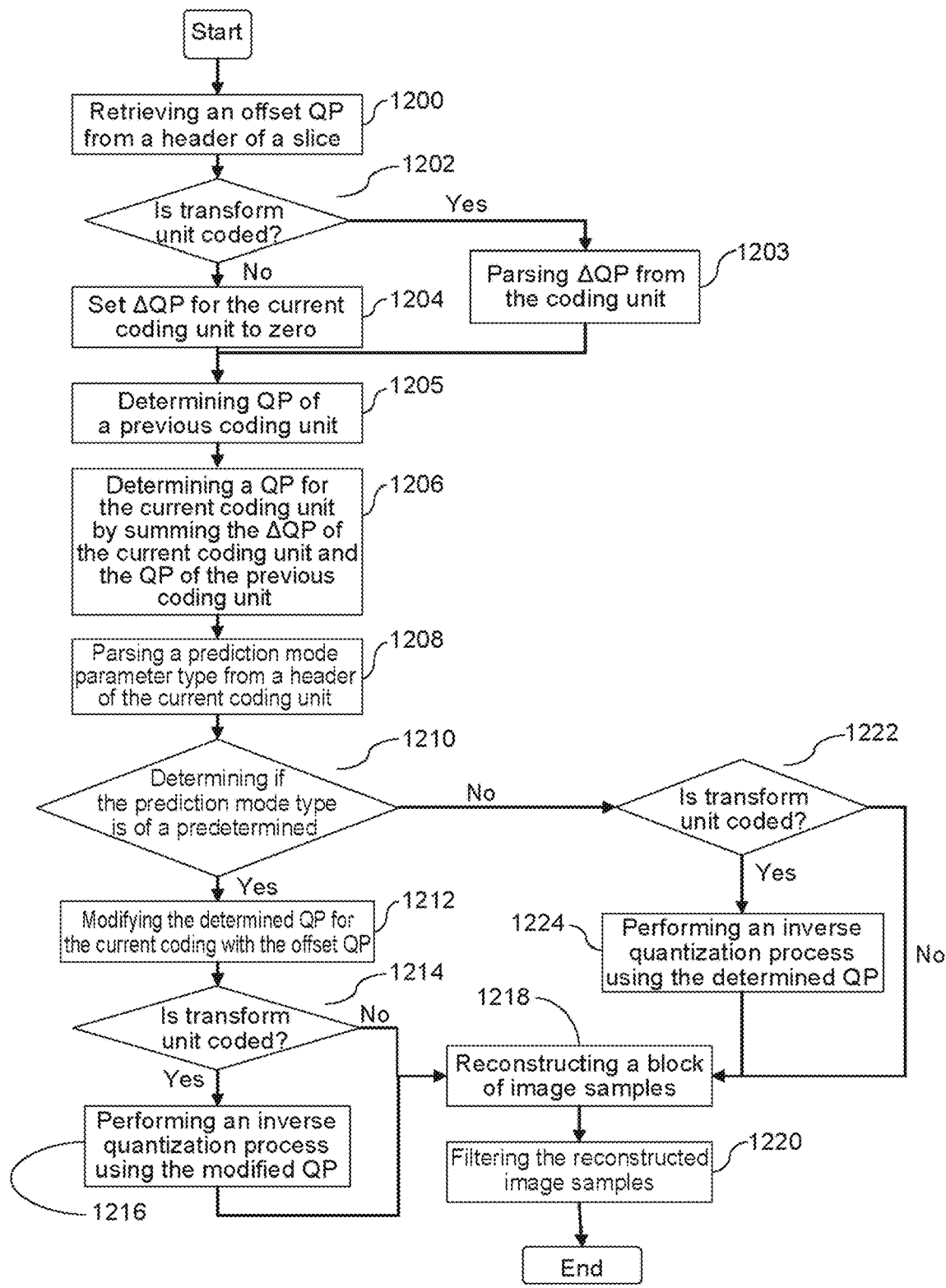
FIG. 12 depicts a flowchart illustrating a method of decoding a coded image according to a third exemplary embodiment of the present invention.

FIG. 12 depicts a flowchart illustrating a method of decoding a coded image 410 according to a third exemplary embodiment of the present invention. This method is a modification of the method of decoding a coded image 410 according to the second exemplary embodiment of the present invention illustrated in FIG. 7 which, for example, improves the decoding efficiency. In the method of decoding according to the second exemplary embodiment, after the offset QP is parsed from a header 304 of a slice 302 of the coded image 410 in step 700, the QP of a previous coding unit is retrieved in step 702 and then a DELTAQP is parsed from a header 312 of the current coding unit 310 in step 704 so as to determine the QP for the current coding unit 310 by summing the QP of the previous coding unit and the parsed DELTAQP in step 706. The inventors have found that in the case where the transform unit 318 included in the current coding unit 310 is not coded, it is not necessary to signal or parse the DELTAQP from the current coding unit 310. Instead of parsing the DELTAQP from the current coding unit 310, the DELTAQP can simply be set to zero. Accordingly, in this case, the decoding efficiency can be improved by skipping the signalling and parsing of the DELTAQP.

The method of decoding a coded image 410 according to the third exemplary embodiment will be described in further details below with reference to FIG. 12. As shown in the flowchart, in step 1200, an offset QP is first retrieved or parsed from a header 304 of a slice 302 of the coded image 410. Then in step 1202, it is determined or detected whether a transform unit 318 of the coding unit 310 has been coded (i.e., whether a transmit unit 318 exists). For example, typically, a transform unit 318 has an identifiable parameter or flag associated with it. Therefore, detecting the existence of such a parameter/flag in the coding unit 310 would indicate that a transform unit 318 has been coded. It also follows that the lack of such a parameter/flag in the coding unit 310 would indicate that a transform unit 318 has not been coded. For example, in special prediction modes such as "skip mode" and "direct mode", such a parameter/flag is not present in the coding unit 310 and thus it can be deduced that a transform unit 318 has not been coded. It is apparent to the person skilled in the art that "skip mode" and "direct mode" are a subset of the inter-picture prediction mode. In the case where a transform unit 318 is coded (i.e., exists), a value of the DELTAQP is obtained by parsing the DELTAQP from a header 312 of a coding unit 310 in step 1203. On the other hand, if a transform unit 318 is not coded (i.e., does not exist), the value of the DELTAQP is set to be zero in step 1204. Subsequently in step 1205, the QP of a previous coding unit is determined.

In step 1206, a QP for the coding unit 310 is determined by summing the QP of a previous coding unit and the DELTAQP. Next in step 1208, a prediction mode parameter 314 is parsed from a header 312 of the coding unit 310. The parsed prediction mode parameter 314 is then judged or compared to determine if it has a predefined value in step 1210. As described hereinbefore, an example of the predefined value is a value, such as "0", that represents or indicates that the coding unit 310 is coded by an intra prediction mode.

If the parsed prediction mode parameter has the predefined value, the determined QP is modified by subtracting from it the value of the parsed offset QP in step 1212. Thereafter, in step 1214, if a transform unit is coded, an inverse quantization process is performed on a block of quantized transform coefficients using the modified QP in step 1216 to produce a block of decoded transform coefficients and then an inverse transformation process is performed on the decoded transform coefficients to produce a block of decoded residuals. Subsequently, in step 1218, a block of reconstructed samples (or a reconstructed image) is generated based on the block of decoded residuals and a block of predicted samples (e.g., the block of predicted samples D907 or D911 as described hereinbefore with reference to FIG. 9). In step 1214, if no transform unit is coded, the method will proceed to step 1218 to generate a block of reconstructed samples. In this case, since no transmit unit is coded, the inverse quantization process can be omitted and the block of reconstructed samples produced will simply be the block of predicted samples.

On the other hand, if the parsed prediction mode does not have the predefined value in step 1210, the subsequent step depends on whether the transform unit 318 is coded in step 1222. If a transform unit 318 is coded, an inverse quantization process is performed on a block of quantized transform coefficients using the determined QP in step 1224 to produce a block of decoded transform coefficients and then an inverse transformation process is performed on the decoded transform coefficients to produce a block of decoded residuals. Subsequently, in step 1218, a block of reconstructed samples (or a reconstructed image) is generated based on the block of decoded residuals and a block of predicted samples (e.g., the block of predicted samples D907 or D911 as described hereinbefore with reference to FIG. 9). However, in step 1222, if no transform unit is coded, the method will proceed to step 1218 to generate a block of reconstructed samples. In this case, since no transmit unit is coded, the inverse quantization process can be omitted and the block of reconstructed samples produced will simply be the block of predicted samples.

According to an embodiment of the present invention, in addition to QP being applied in the inverse quantization process, the QP (i.e., determined or modified QP) can also be used to control post-processing techniques such as an in-loop filter (e.g., a deblocking or smoothening filter) to improve the picture quality. For an in-loop filter, the QP can be used to control the deblocking filter for filtering a block of reconstructed samples (or a reconstructed image). In particular, the QP can be used as a factor in determining the strength of the in-loop filter. For example, when the QP is large, the subjective quality is low and thus a stronger filter is applied to reduce the visual artifacts due to high compression. On the other hand, when the QP is low, the subject quality is high and thus a weaker filter will be sufficient.

Therefore, the method of decoding a coded image 410 according to embodiments of the present invention described hereinbefore can further comprise a step of filtering the block of reconstructed samples (or reconstructed image) using either the modified or determined QP accordingly. For example, the modified QP is used when the prediction mode type is intra prediction mode and the determined QP is used when the prediction mode type is inter-picture prediction mode. By way of example, FIG. 12 illustrates the method of decoding a coded image 410 according to the third exemplary embodiment further comprising the step of filtering the block of reconstructed samples as denoted by reference numeral 1230.

Embodiment 4

The processing described in each of Embodiments can be simply implemented in an independent computer system, by recording, in a recording medium, a program for implementing the configurations of the video coding method and the video decoding method described in each of Embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of Embodiments and systems using thereof will be described.

Figure 13:
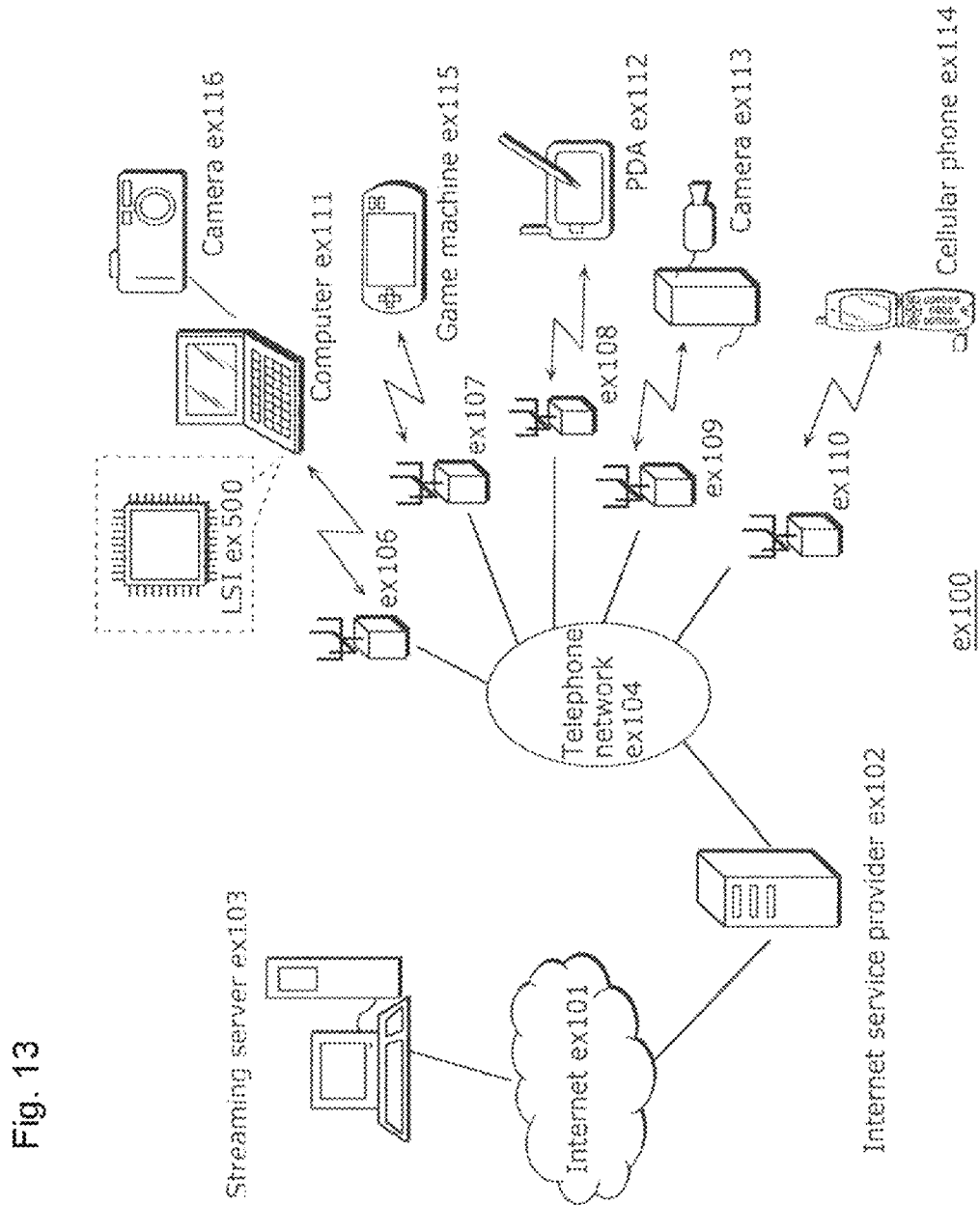
FIG. 13 depicts an overall configuration of a content providing system for implementing content distribution services according to an embodiment of the present invention.

FIG. 13 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 13, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex11 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 14:
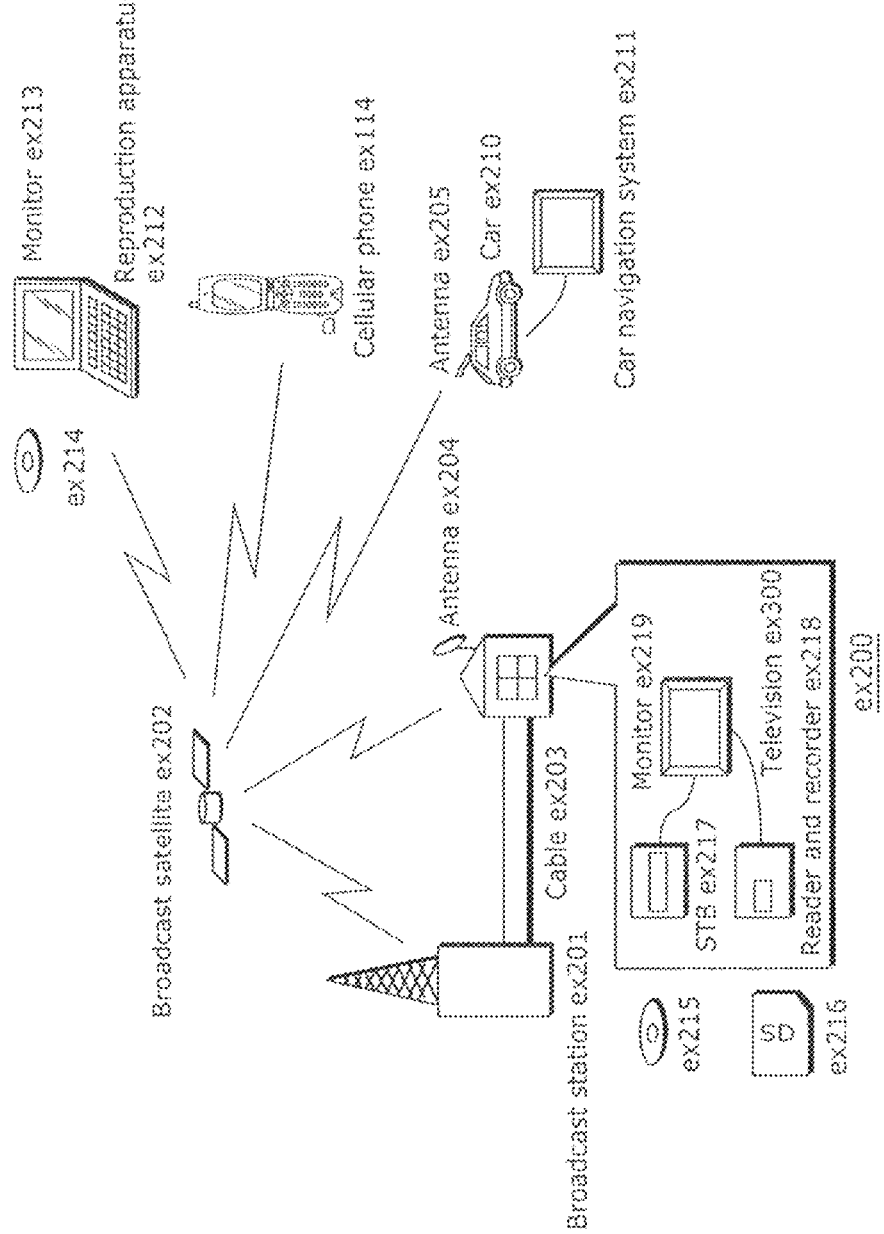
FIG. 14 depicts an overall configuration of a digital broadcasting system according to an embodiment of the present invention.

Aside from the example of the content providing system ex100, at least one of the video coding apparatus and the video decoding apparatus described in each of Embodiments may be implemented in a digital broadcasting system ex200 illustrated in FIG. 14. More specifically, a broadcast station ex201 communicates or transmits, via radio waves to a broadcast satellite ex202, multiplexed data obtained by multiplexing audio data and others onto video data. The video data is data coded by the video coding method described in each of Embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of Embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 15:
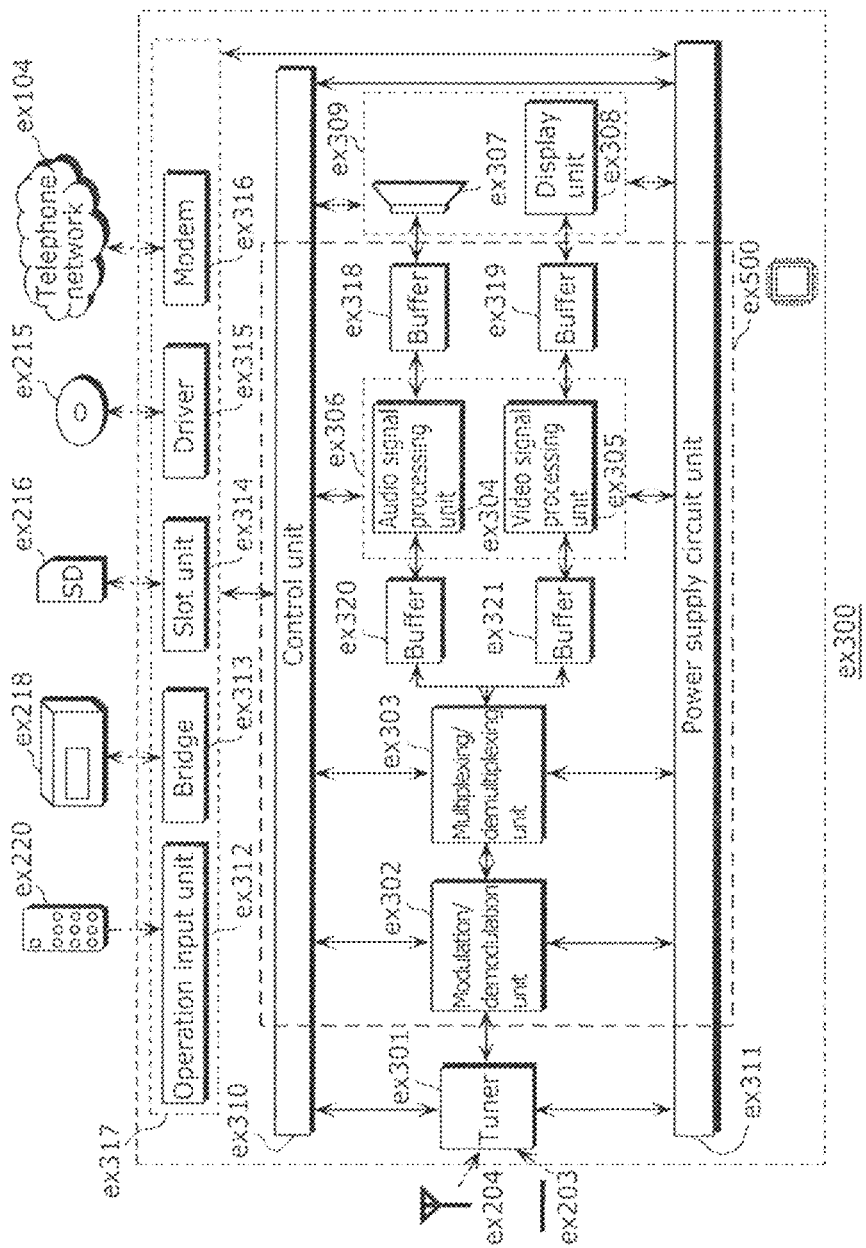
FIG. 15 depicts a block diagram illustrating an example of a configuration of a television according to an embodiment of the present invention.

FIG. 15 illustrates the television (receiver) ex300 that uses the video coding method and the video decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 16:
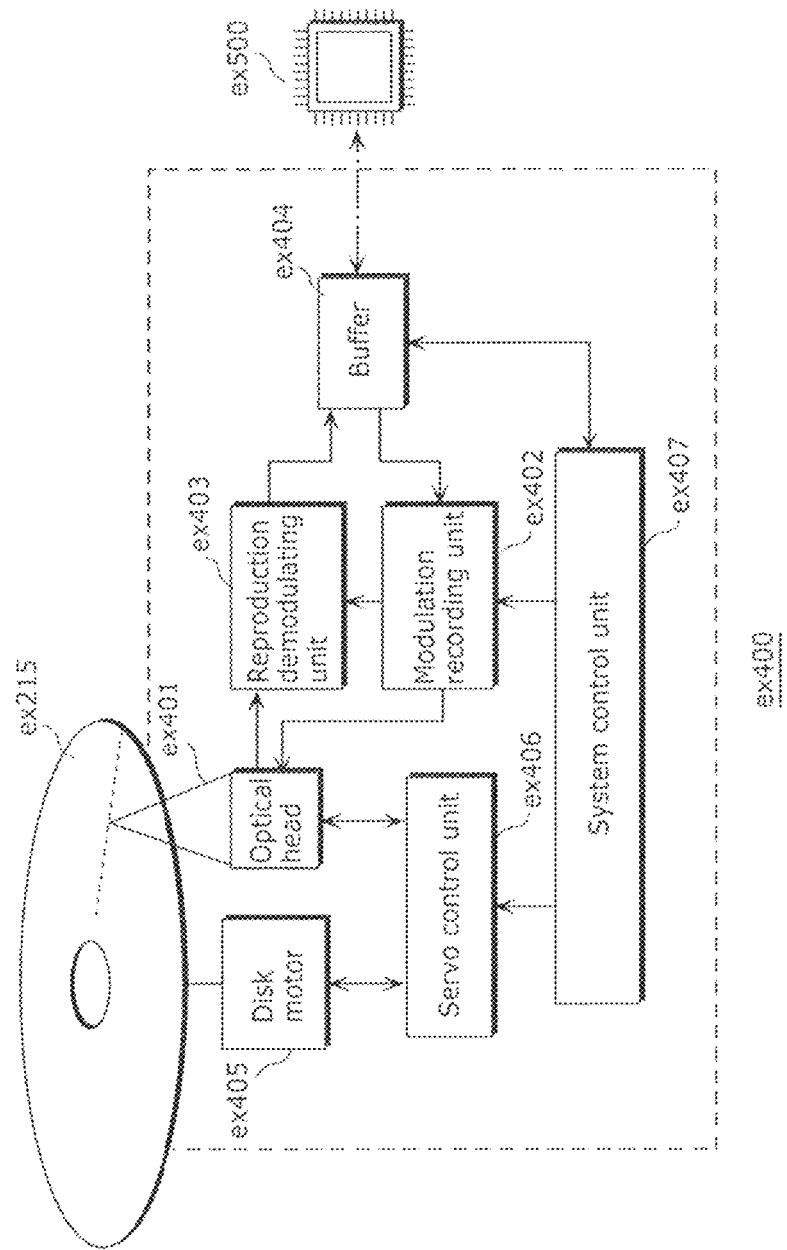
FIG. 16 depicts a block diagram illustrating an example of a configuration of an information reproducing/recording unit that reads and writes information from or on a recording medium that is an optical disk according to an embodiment of the present invention.

As an example, FIG. 16 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 17:
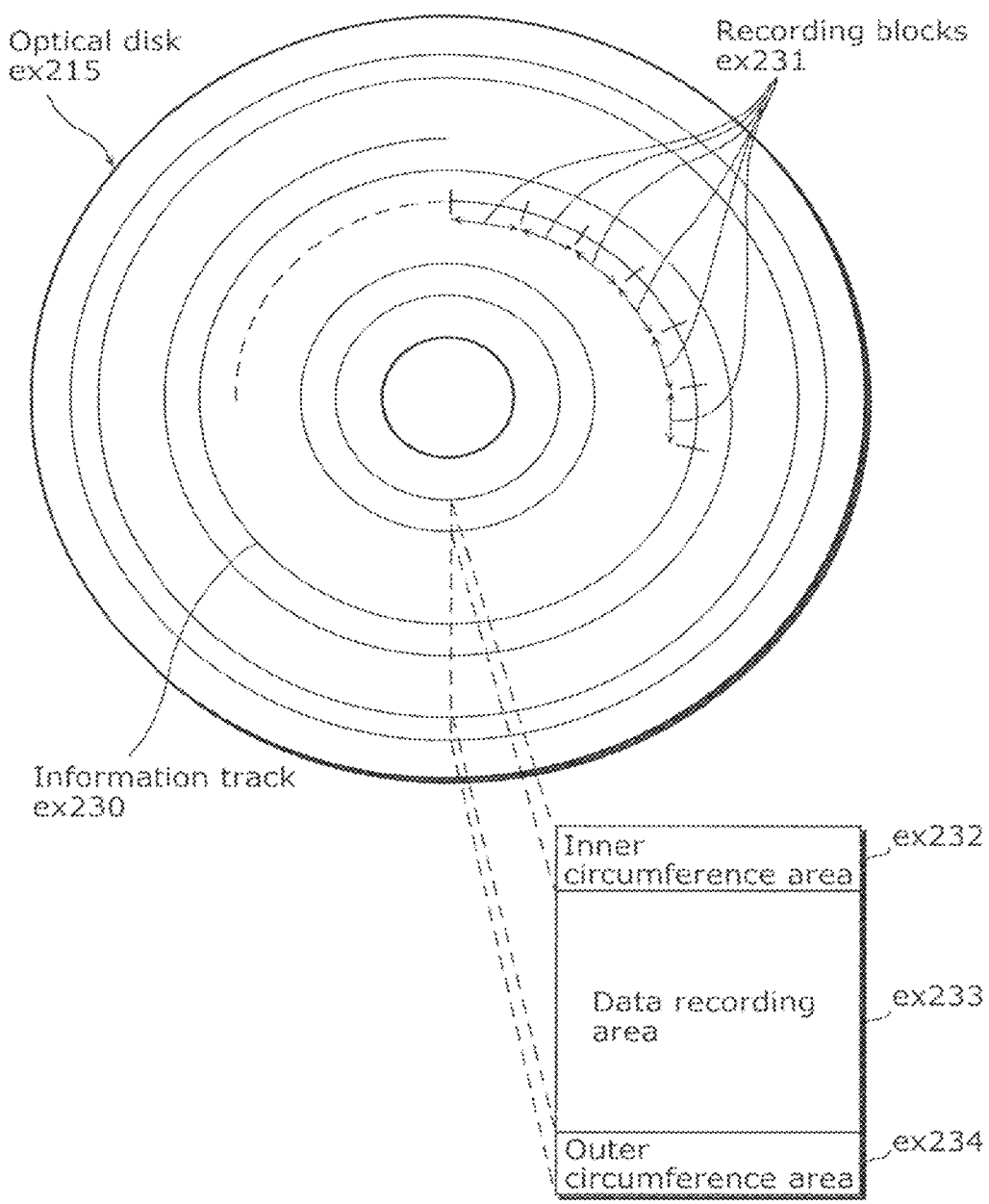
FIG. 17 depicts a drawing showing an example of a configuration of a recording medium that is an optical disk according to an embodiment of the present invention.

FIG. 17 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 15. The same will be true for the configuration of the computer ex111, the cellular phone ex114, and others.

FIG. 18A illustrates the cellular phone ex114 that uses the video coding method and the video decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 18B:
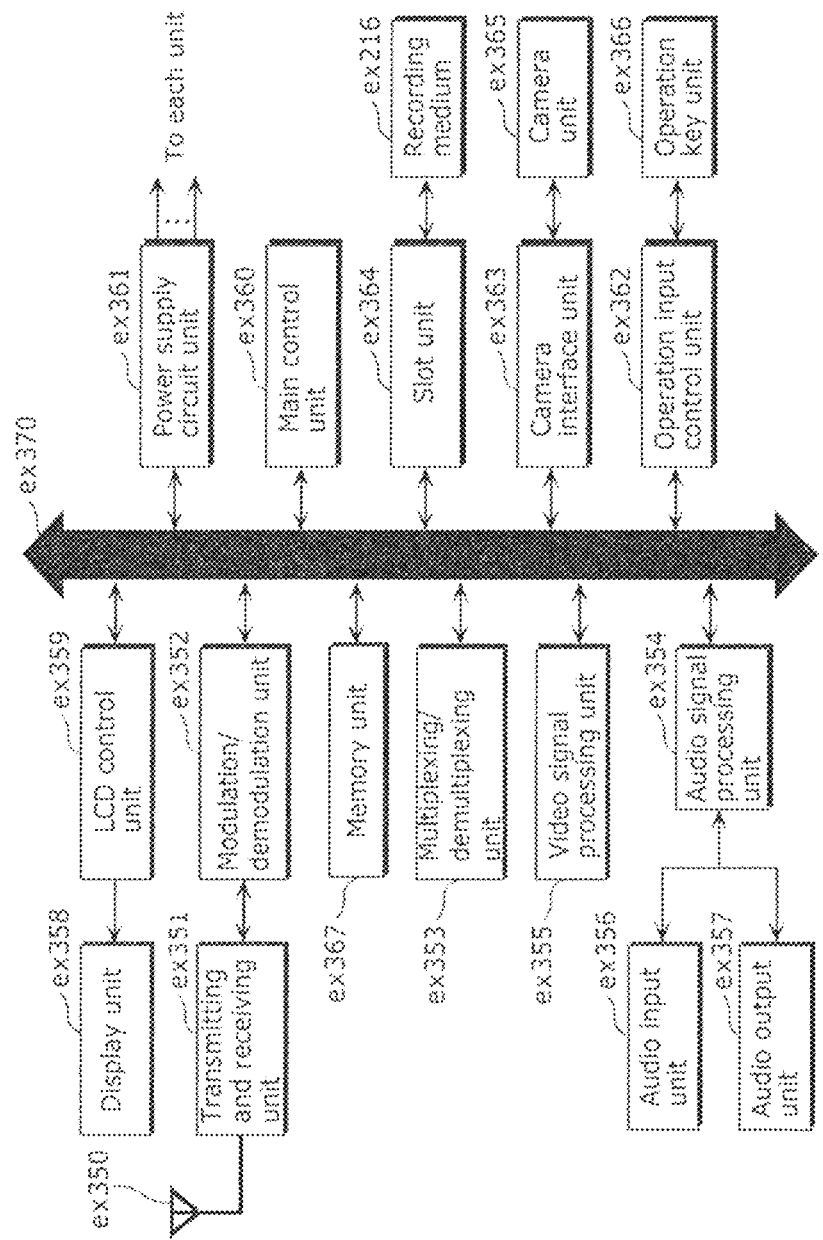
FIG. 18B depicts a block diagram showing an example of a configuration of the cellular phone according to an embodiment of the present invention.

Next, an example of a configuration of the cellular phone ex114 will be described with reference to FIG. 18B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 5

Video data can be generated by switching, as necessary, between (i) the video coding method or the video coding apparatus shown in each of Embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of Embodiments will be hereinafter described. The multiplexed data is a digital stream in the MPEG2-Transport Stream format.

Figure 19:
FIG. 19 depicts a drawing showing a structure of multiplexed data according to an embodiment of the present invention.

FIG. 19 illustrates a structure of the multiplexed data. As illustrated in FIG. 19, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1BF are allocated to the video streams to be used for secondary video of the movie, and 0x1A00 to 0x1A1F are allocated to the audio streams to be used for the secondary video to be mixed with the primary audio.

Figure 20:
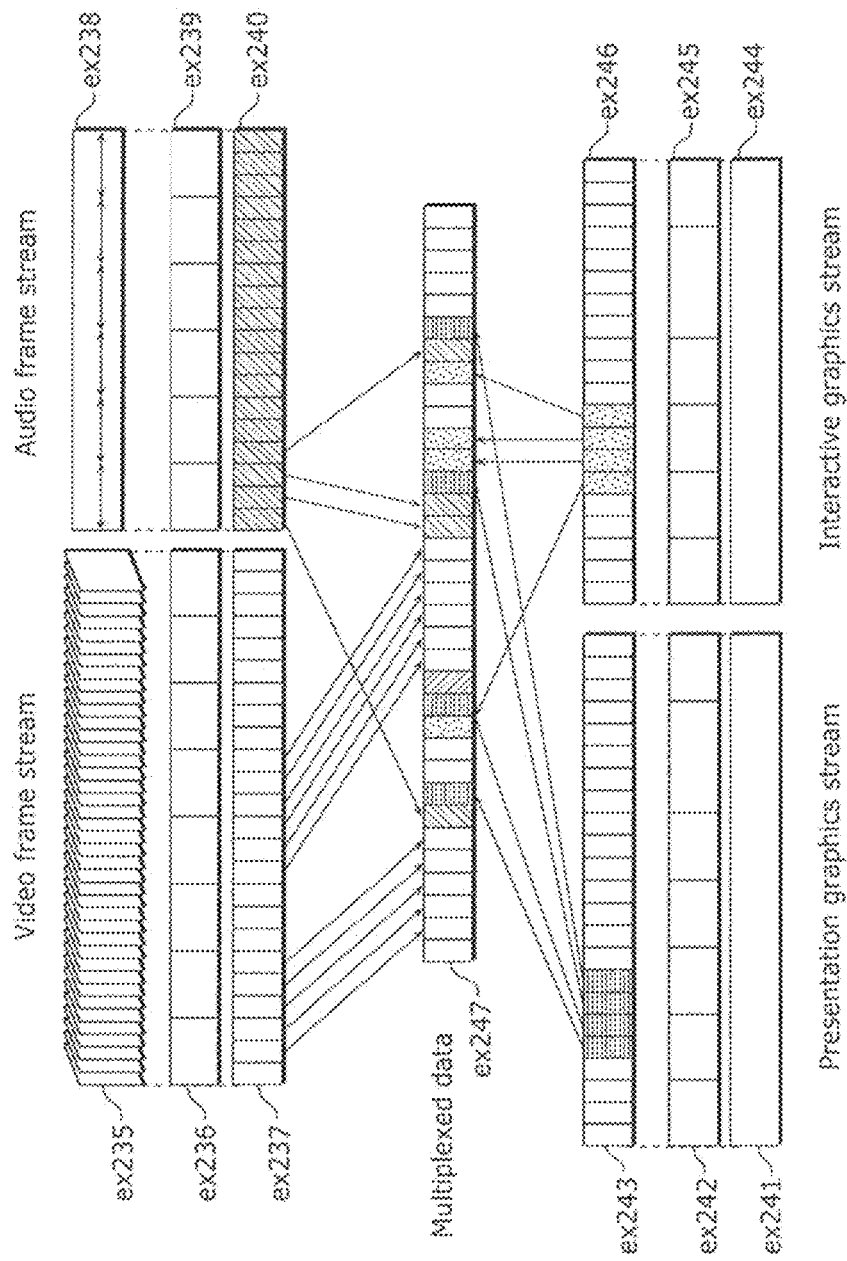
FIG. 20 depicts a drawing schematically illustrating how each of the streams is multiplexed in multiplexed data according to an embodiment of the present invention.

FIG. 20 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 21:
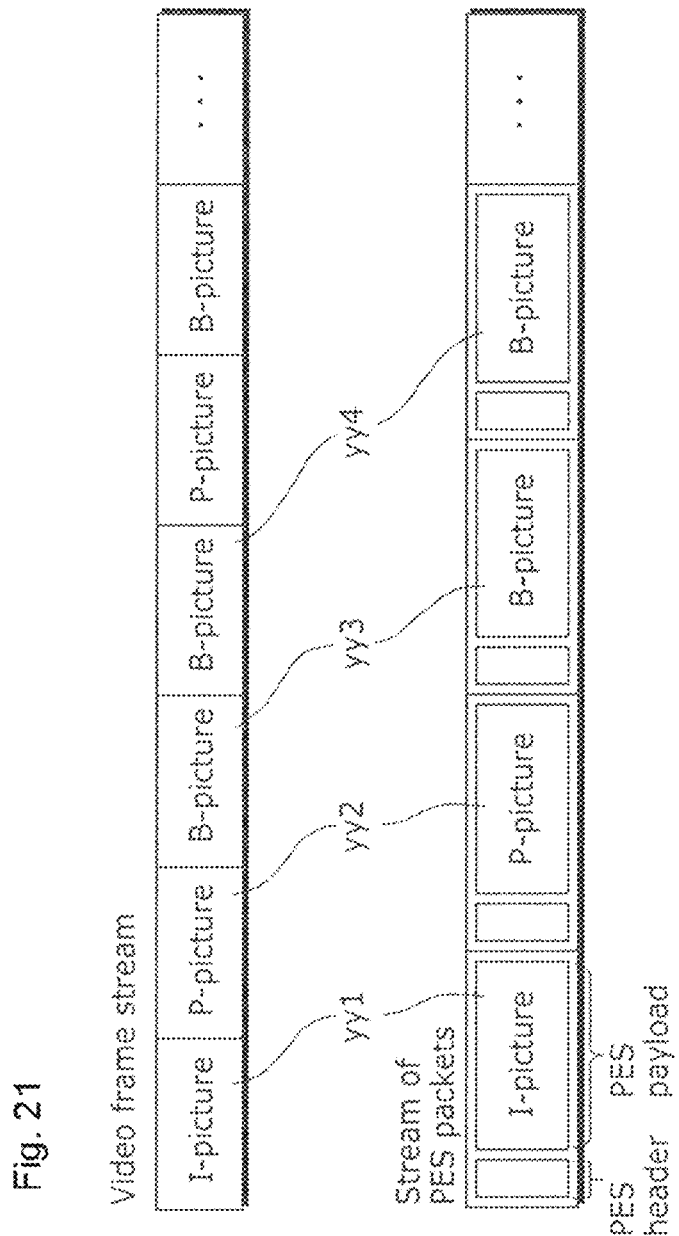
FIG. 21 depicts a drawing illustrating how a video stream is stored in a stream of PES packets in more detail according to an embodiment of the present invention.

FIG. 21 illustrates how a video stream is stored in a stream of PES packets in more detail. The first bar in FIG. 21 shows a video frame stream in a video stream. The second bar shows the stream of PES packets. As indicated by arrows denoted as yy1, yy2, yy3, and yy4 in FIG. 21, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 22:
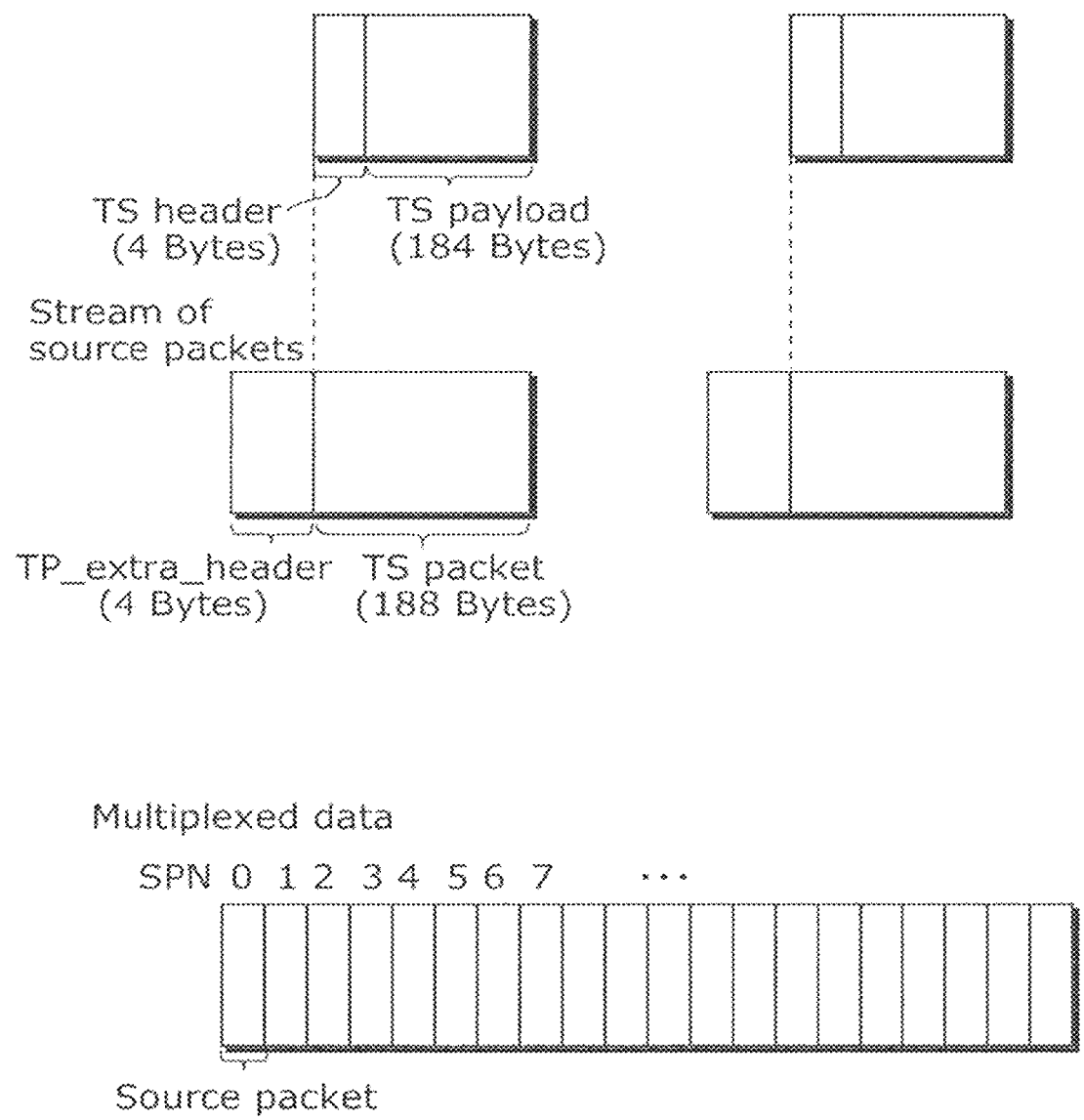
FIG. 22 depicts a drawing showing a structure of TS packets and source packets in the multiplexed data according to an embodiment of the present invention.

FIG. 22 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 22. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 23:
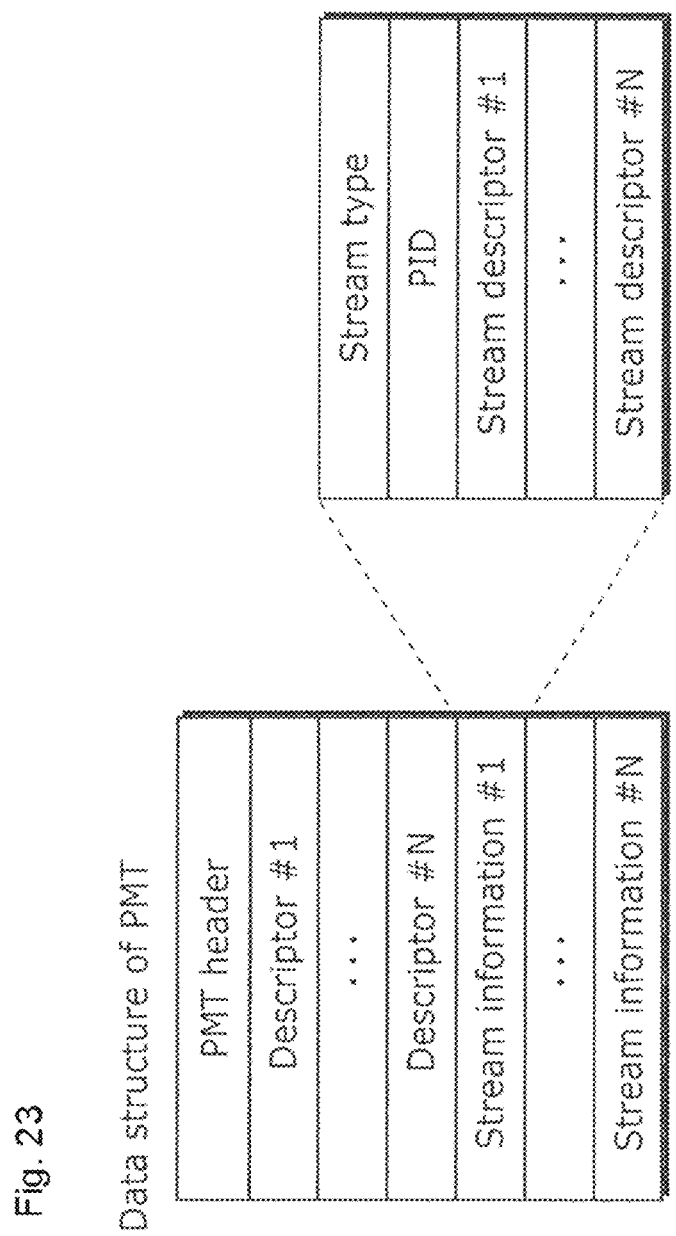
FIG. 23 depicts a drawing showing a data structure of a PMT according to an embodiment of the present invention.

FIG. 23 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 24:
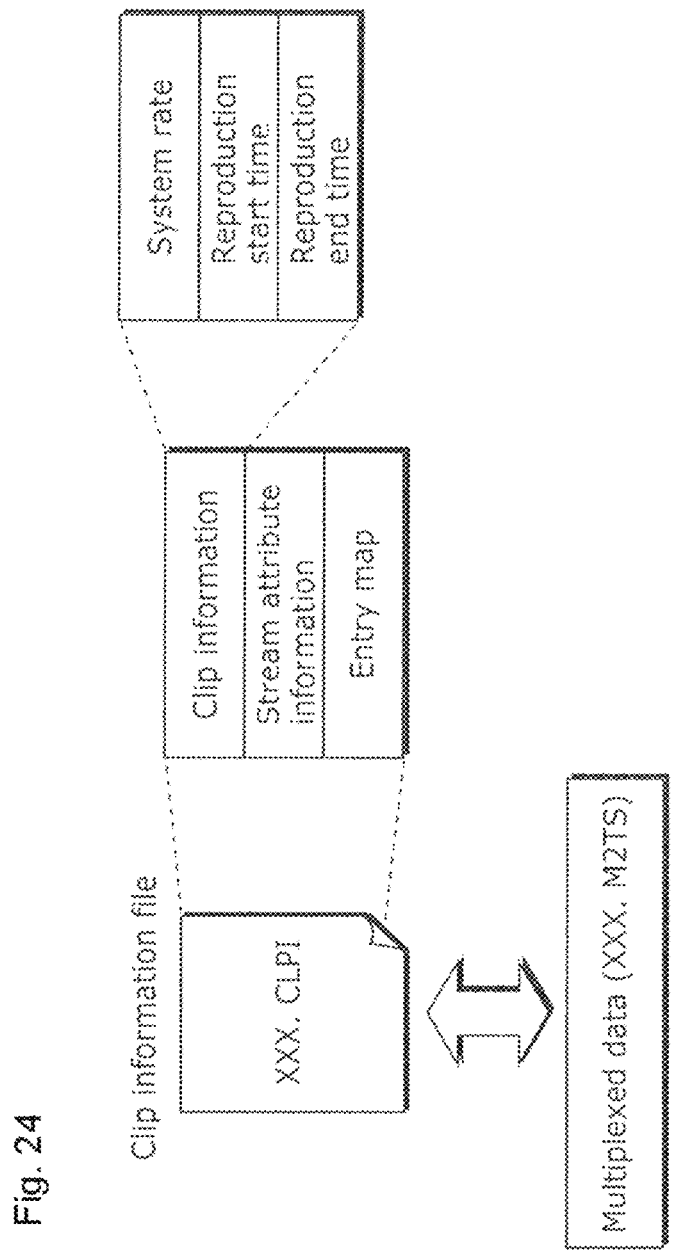
FIG. 24 depicts a drawing showing an internal structure of multiplexed data information according to an embodiment of the present invention.

Each of the multiplexed data information files is management information of the multiplexed data as shown in FIG. 24. The multiplexed data information files are in one to one correspondence with the multiplexed data, and each of the files includes multiplexed data information, stream attribute information, and an entry map.

As illustrated in FIG. 24, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 25:
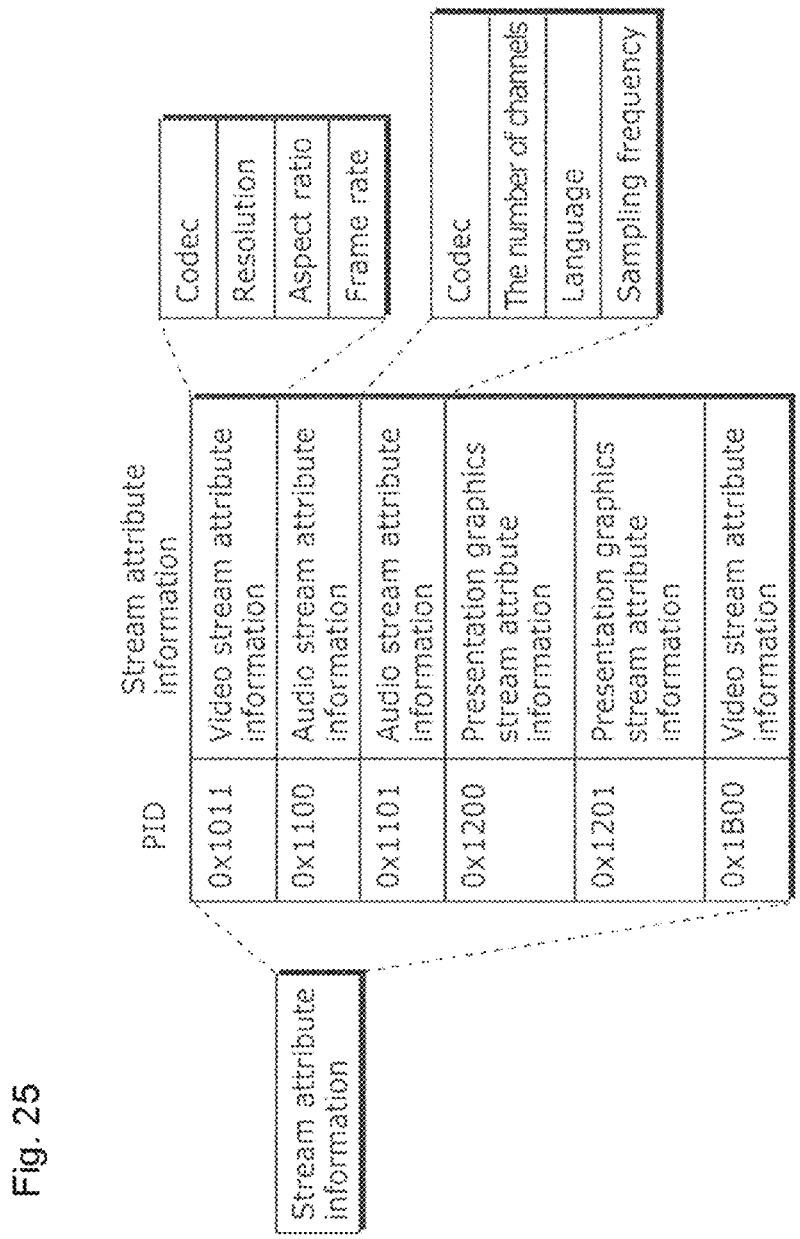
FIG. 25 depicts a drawing showing an internal structure of stream attribute information according to an embodiment of the present invention.

As shown in FIG. 25, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 5, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the configuration, the video data generated by the video coding method or the video coding apparatus described in each of Embodiments can be distinguished from video data that conforms to another standard.

Figure 26:
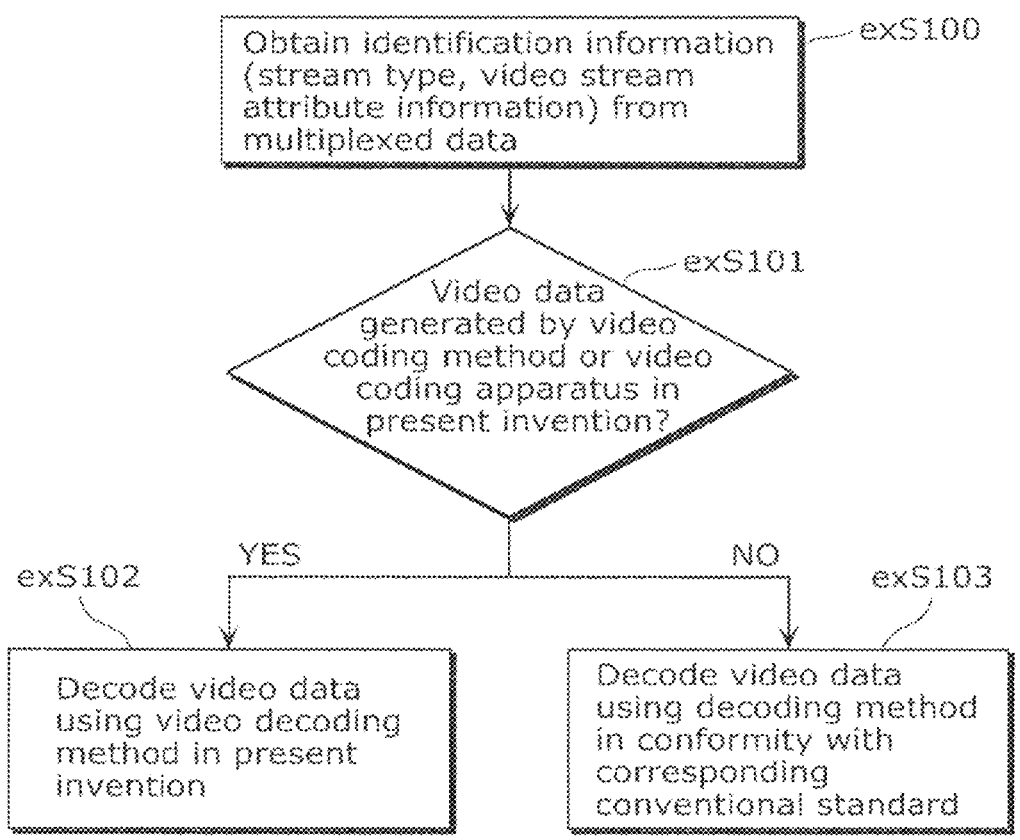
FIG. 26 depicts drawing showing steps for identifying video data according to an embodiment of the present invention.

Furthermore, FIG. 26 illustrates steps of the video decoding method according to Embodiment 5. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, decoding is performed by the video decoding method in each of Embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of Embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus in Embodiment 5 can be used in the devices and systems described above.

Embodiment 6

Figure 27:
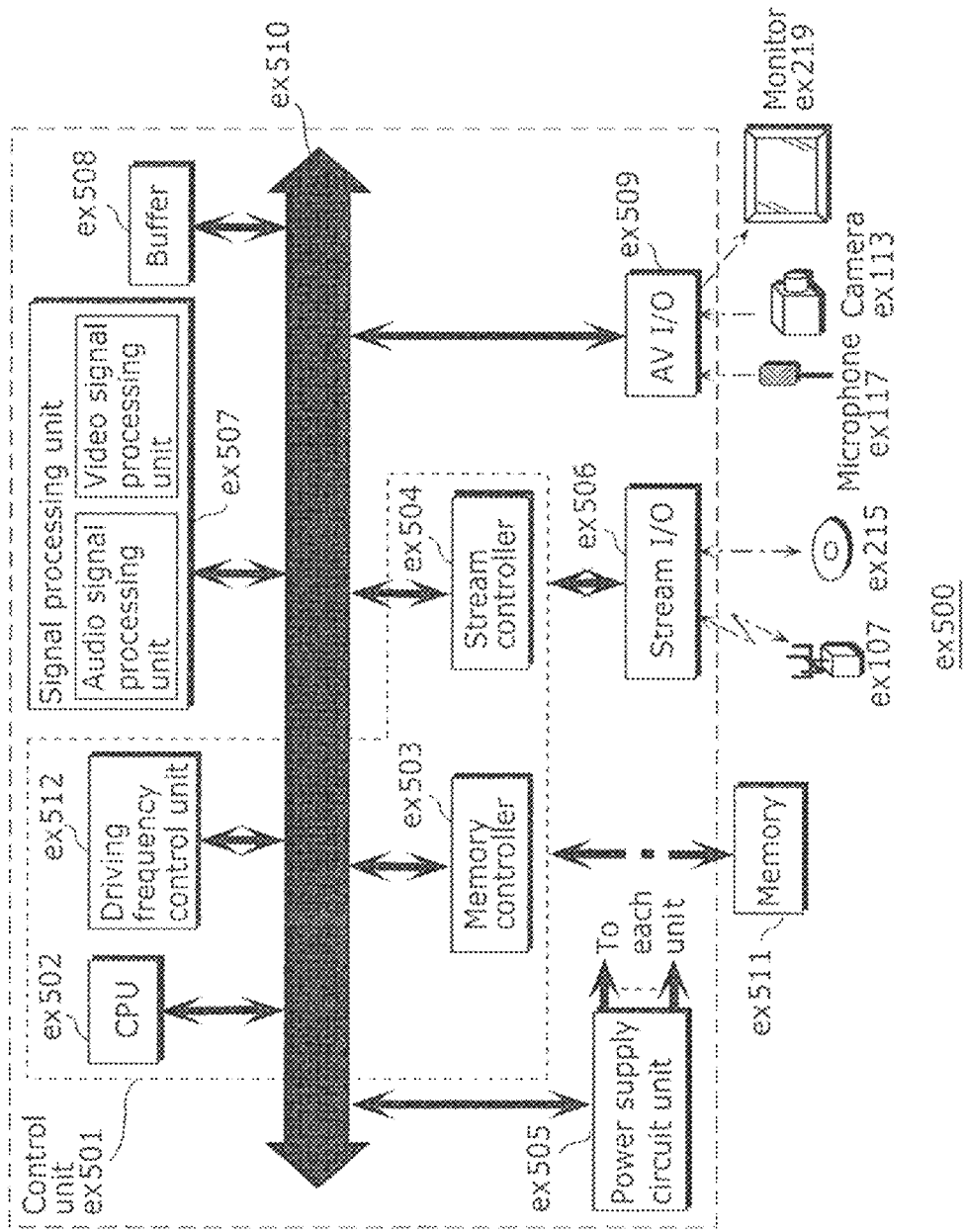
FIG. 27 depicts a block diagram illustrating an example of a configuration of an integrated circuit for implementing the video coding method and the video decoding method according to each of Embodiments.

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 27 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the video coding method or by the video coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 28:
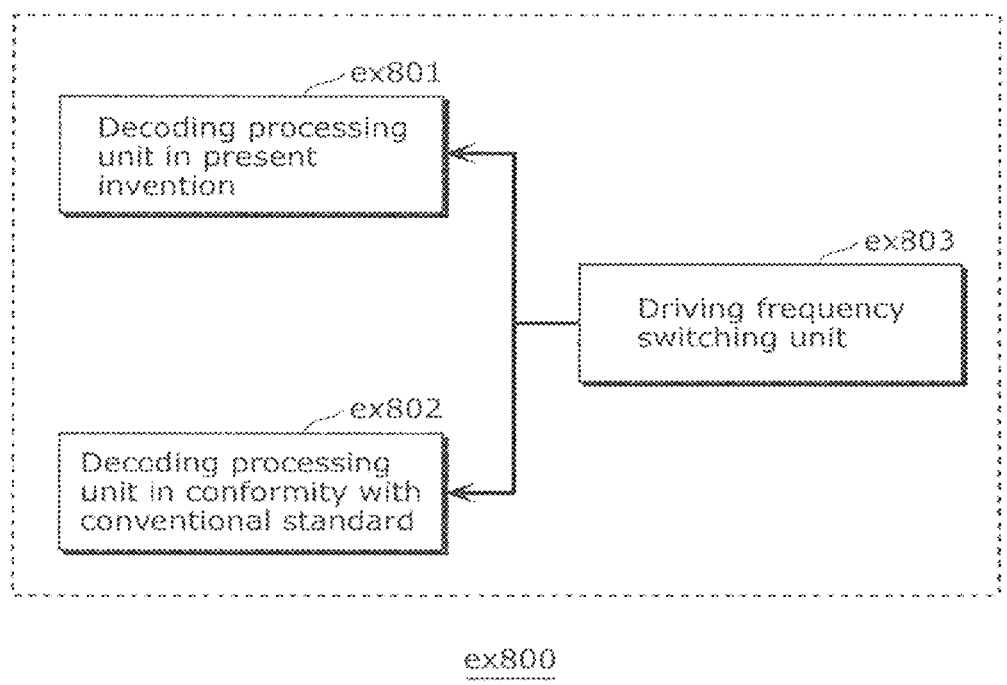
FIG. 28 depicts a drawing showing a configuration for switching between driving frequencies according to an embodiment of the present invention.

In order to solve the problem, the video decoding apparatus, such as the television ex300 and the LSI ex500 is configured to determine to which standard the video data conforms, and switch between the driving frequencies according to the determined standard. FIG. 28 illustrates a configuration ex800 in Embodiment 7. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 27. Here, each of the decoding processing unit ex801 that executes the video decoding method described in each of Embodiments and the decoding processing unit ex802 that conforms to the conventional standard corresponds to the signal processing unit ex507 in FIG. 25. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 30. The driving frequency can be selected by storing the look-up table in the buffer ex508 and in an internal memory of an LSI, and with reference to the look-up table by the CPU ex502.

Figure 29:
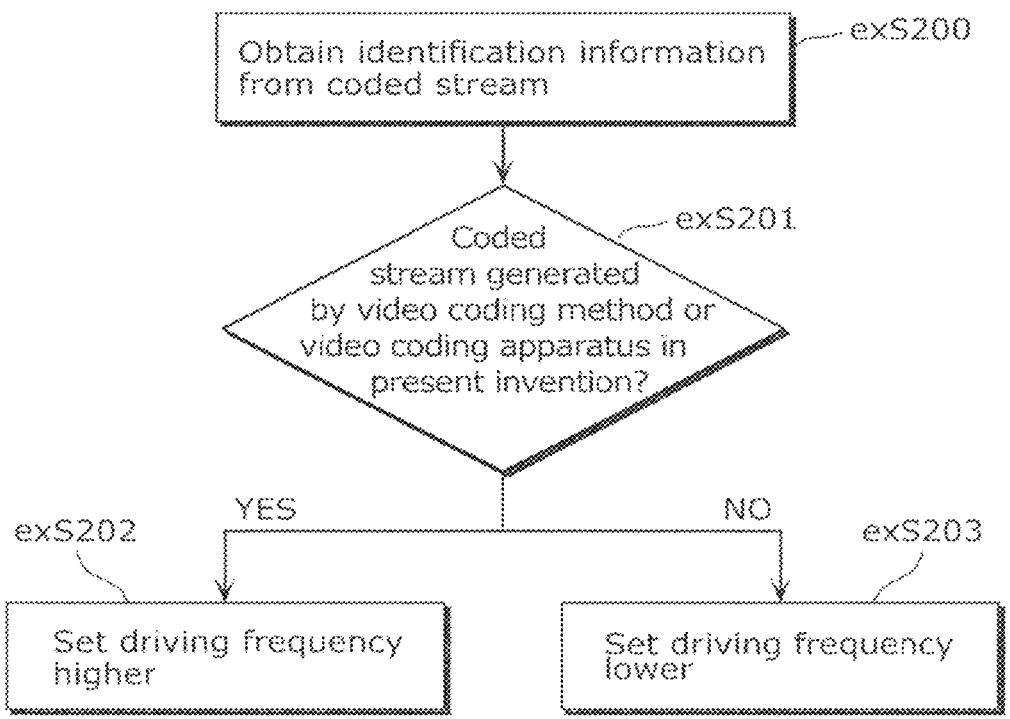
FIG. 29 depicts a drawing showing steps for identifying video data and switching between driving frequencies according to an embodiment of the present invention.

FIG. 29 illustrates steps for executing a method in Embodiment 7. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the video coding method and the video coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Ex900 in FIG. 31A shows an example of the configuration. For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. Since the present invention is characterized by a transformation unit in particular, for example, the dedicated decoding processing unit ex901 is used for inverse transform. Otherwise, the decoding processing unit is probably shared for one of the entropy coding, inverse quantization, deblocking filtering, and motion compensated prediction, or all of the processing. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 31B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 8 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

It will be appreciated by the person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

INDUSTRIAL APPLICABILITY

The present invention is applicable to a coding apparatus which codes audio, still images, and video and to a decoding apparatus which decodes data coded by the coding apparatus. For example, the present invention is applicable to various audio-visual devices such as audio devices, cellular phones, digital cameras, BD recorders, and digital televisions.

The invention claimed is:
1. A decoder comprising:
a memory; and
a processor coupled to the memory and configured to:
calculate a first value of a quantization parameter;
in a first prediction mode, read a predetermined offset from header information to determine a delta offset to be equal to the predetermined offset;
in a second prediction mode different from the first prediction mode, determine the delta offset to be equal to zero without reading the predetermined offset from the header information;

add the first value and the delta offset to derive a second value; and perform inverse-quantization on a unit of an image according to the second value.

2. A decoding method comprising:

calculating a first value of a quantization parameter;

in a first prediction mode, reading a predetermined offset from header information to determine a delta offset to be equal to the predetermined offset;

in a second prediction mode different from the first prediction mode, determining the delta offset to be equal to zero without reading the predetermined offset from the header information;

adding the first value and the delta offset to derive a second value; and performing inverse-quantization on a unit of an image according to the second value.

3. The decoder according to claim 1, wherein the first prediction mode is an intra prediction mode and the second prediction mode is an inter prediction mode.

4. The decoding method according to claim 2, wherein the first prediction mode is an intra prediction mode and the second prediction mode is an inter prediction mode.

* * * * *